(12) United States Patent
Ramachandra et al.

(10) Patent No.: US 11,902,141 B2
(45) Date of Patent: Feb. 13, 2024

(54) RADIO NETWORK NODE, USER EQUIPMENT (UE) AND METHODS PERFORMED IN A WIRELESS COMMUNICATION NETWORK

(71) Applicant: Telefonaktiebolaget LM Ericsson (publ), Stockholm (SE)

(72) Inventors: Pradeepa Ramachandra, Linköping (SE); Jens Bergqvist, Linköping (SE); Nicklas Johansson, Brokind (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 379 days.

(21) Appl. No.: 17/287,327

(22) PCT Filed: Oct. 30, 2019

(86) PCT No.: PCT/SE2019/051082
§ 371 (c)(1),
(2) Date: Apr. 21, 2021

(87) PCT Pub. No.: WO2020/091677
PCT Pub. Date: May 7, 2020

(65) Prior Publication Data
US 2021/0367876 A1    Nov. 25, 2021

Related U.S. Application Data

(60) Provisional application No. 62/753,994, filed on Nov. 1, 2018.

(51) Int. Cl.
*H04W 72/02* (2009.01)
*H04L 43/16* (2022.01)
*H04W 24/08* (2009.01)
*H04W 24/10* (2009.01)
*H04W 74/04* (2009.01)

(52) U.S. Cl.
CPC ............. *H04L 43/16* (2013.01); *H04W 24/08* (2013.01); *H04W 24/10* (2013.01); *H04W 74/04* (2013.01)

(58) Field of Classification Search
CPC .............................. H04L 43/16; H04W 24/10
See application file for complete search history.

(56) References Cited

U.S. PATENT DOCUMENTS

2014/0177601 A1 * 6/2014 Nishio ................... H04B 7/024
370/332

OTHER PUBLICATIONS

International Search Report and Written Opinion dated Jan. 24, 2020 for International Application No. PCT/SE2019/051082 filed on Oct. 30, 2019, consisting of 11-pages.
(Continued)

*Primary Examiner* — Zhiren Qin
(74) *Attorney, Agent, or Firm* — Christopher & Weisberg, P.A.

(57) ABSTRACT

Embodiments herein relate to, e.g., a method performed by a user equipment, UE, for handling signal measurements. The UE determines whether one or more conditions are fulfilled for indicating that a radio condition is below a certain level. In response to determining that one or more conditions are fulfilled and thereby indicating the radio condition is below a threshold, the UE transmits a report with restricted content.

4 Claims, 12 Drawing Sheets

(56) References Cited

OTHER PUBLICATIONS

3GPP TSG-RAN WG2 #Ad Hoc Tdoc R2-1707286; Title: Remaining open issues on measurement reporting in NR; Agenda Item: 10.4.1.4.3; Source: Ericsson; Document for: Discussion; Date and Location: Jun. 27-29, 2017, Qingdao, China, consisting of 8-pages.
3GPP TSG-RAN WG2 AH 1807 R2-1809590 (resubmission of R2-1807136); Title: Measurement priority handling in NR; Agenda Item: 10.4.1.4.6; Source: Ericsson; Document for: Discussion, Decision; Date and Location: Jul. 2-6, 2018, Montreal, Canada, consisting of 5-pages.
3GPP TSG-RAN WG2 #104 R2-1818365; Title: On measurement report size reduction; Agenda Item: 10.4.1.4.1; Source: Ericsson; Document for: Discussion, Decision; Date and Location: Nov. 12-16, 2018, Spokane, USA, consisting of 4-pages.
ETSI TS 138 331 V15.3.0; 5G; NR; Radio Resource Control (RRC); Protocol specification (3GPP TS 38.331 version 15.3.0 Release 15), Oct. 2018, consisting of 441-pages.
ETSI TS 138 300 V15.2.0; 5G; NR; Overall description; Stage-2 (3GPP TS 38.300 version 15.2.0 Release 15), Sep. 2018, consisting of 86-pages.
ETSI TS 133 331 V15.3.0; 5G; LTE; Evolved Universal Terrestrial Radio Access (E-UTRA); Radio Resource Control (RRC); Protocol specification (3GPP TS 36.331version 15.3.0 Release 15), Oct. 2018, consisting of 916-pages.

\* cited by examiner

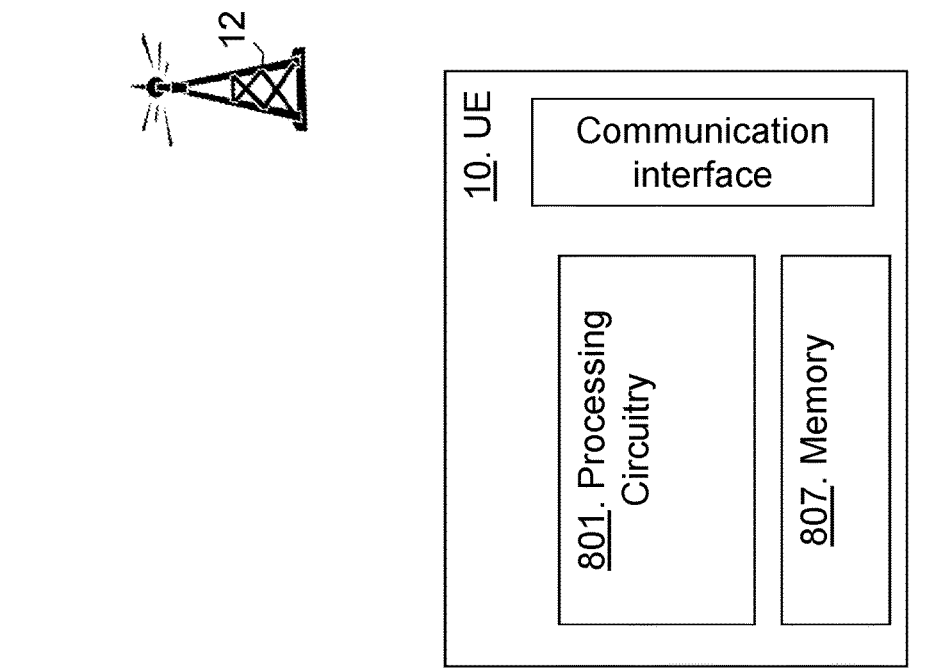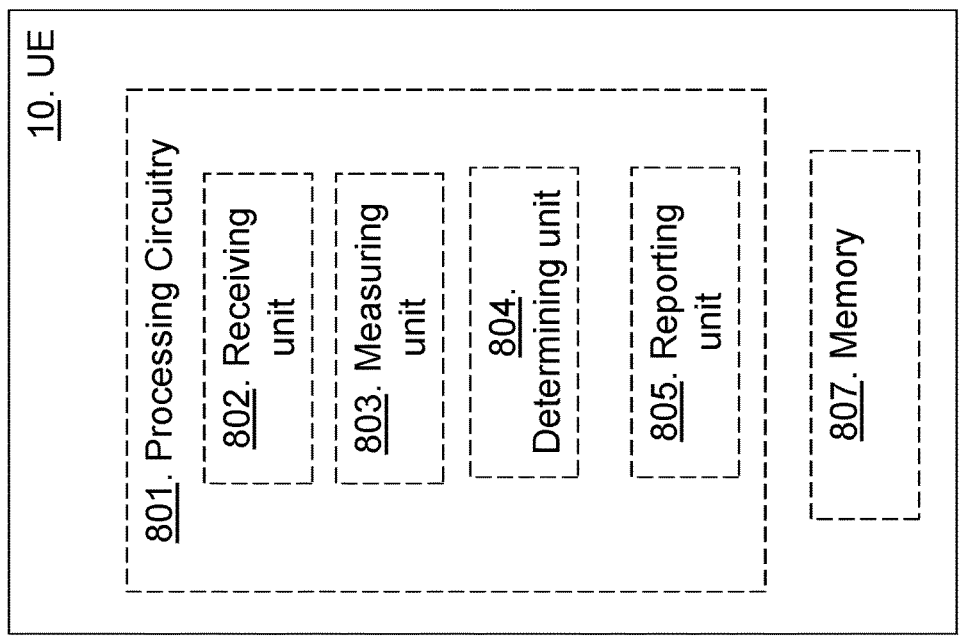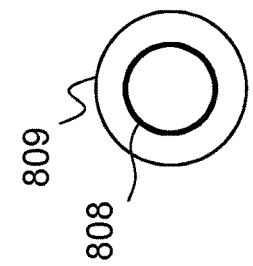
Fig. 7

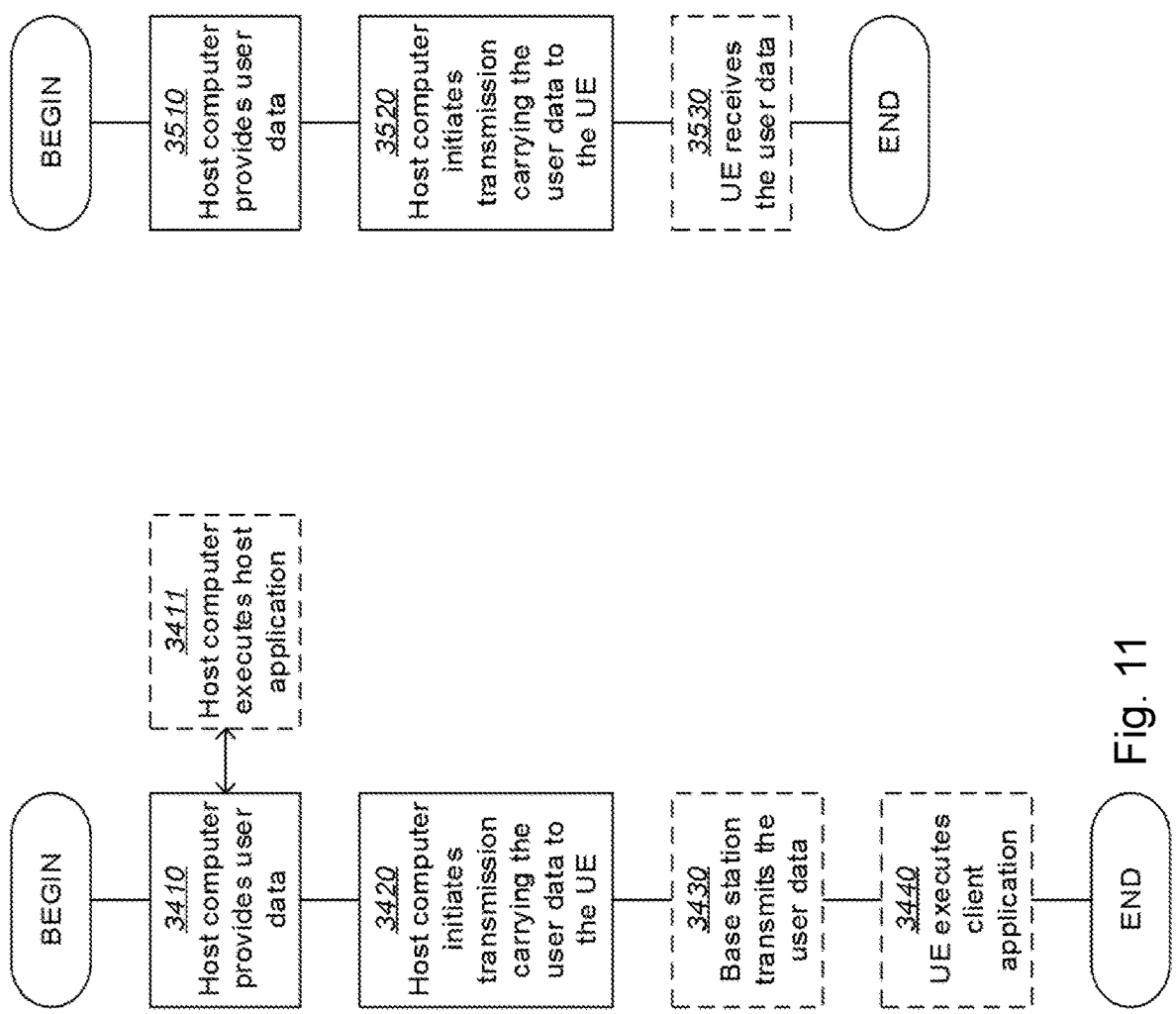

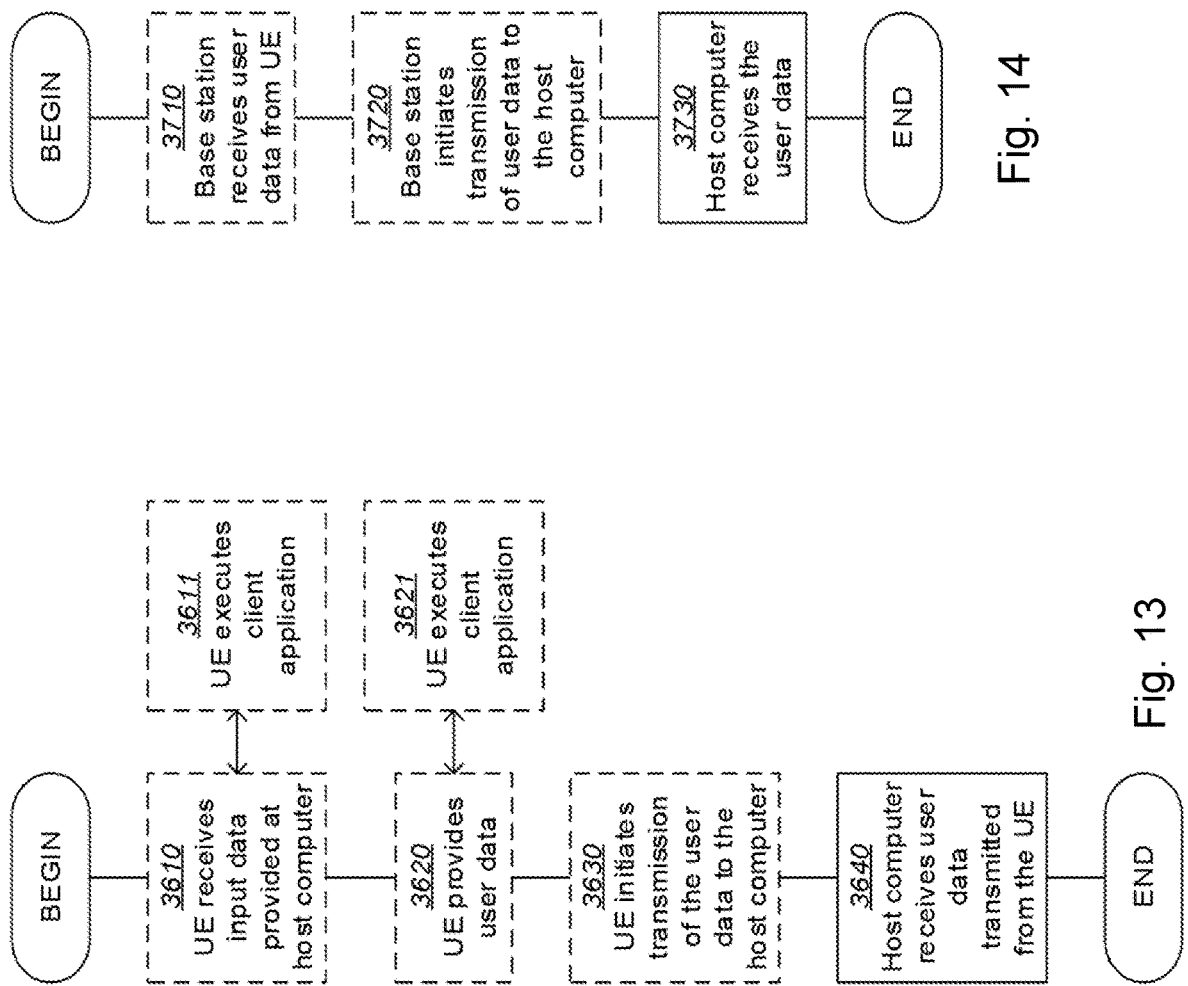

US 11,902,141 B2

RADIO NETWORK NODE, USER EQUIPMENT (UE) AND METHODS PERFORMED IN A WIRELESS COMMUNICATION NETWORK

CROSS-REFERENCE TO RELATED APPLICATIONS

This application is a Submission Under 35 U.S.C. § 371 for U.S. National Stage Patent Application of International Application No.: PCT/SE2019/051082, filed Oct. 30, 2019 entitled "RADIO NETWORK NODE, USER EQUIPMENT (UE) AND METHODS PERFORMED IN A WIRELESS COMMUNICATION NETWORK," which claims priority to U.S. Provisional Application No.: 62/753,994, filed Nov. 1, 2018, the entireties of both of which are incorporated herein by reference.

TECHNICAL FIELD

Embodiments herein relate to a radio network node, a user equipment (UE) and methods performed therein regarding wireless communication. Furthermore, a computer program product and a computer-readable storage medium are also provided herein. Especially, embodiments herein relate to handling communication, such as handling signal measurement of UEs, in a wireless communication network.

BACKGROUND

In a typical wireless communication network, UEs, also known as wireless communication devices, mobile stations, stations (STA) and/or wireless devices, communicate via e.g. a Radio access Network (RAN) to one or more core networks (CN). The RAN covers a geographical area which is divided into service areas or cell areas, with each service area or cell area being served by network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipments. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

The measurement report in NR includes both cell level and beam level measurements for serving cells, best neighbours in serving frequencies and also all the cells that triggered the measurement report (cells in a list such as the triggerdCellsList). The network can configure the UE as to whether the UE should include the best neighbour cell related measurements in the serving frequencies or not via a field such as reportAddNeighMeas field. The network can control as to whether the UE shall include the beam measurements or not using a flag bit such as the includeBeamMeasurements flag in the reportConfigNR.

The network can configure the UE as to whether it should include one or more of Reference Signal Received Power (RSRP), Reference Signal Received Quality (RSRQ) and signal to interference plus noise ratio (SINR) for the cell level measurements via a reportQuantityCell parameter in reportConfig. The network can also configure the UE as to whether the UE should include one or more of RSRP, RSRQ and SINR for the beam level measurements or just the beam indexes via reportQuantityRsIndexes parameter in reportConfig.

Like LTE, the network can configure the UE with A1-A6 events. Typically A1 and A2 events are used for inter-frequency measurement disabling and/or enabling, A3 events for intra frequency handover, A4 event for inter-frequency load balancing and/or carrier aggregation etc.

Related texts from the RRC specification, 38.331-v15.3.0, is given below.

5.5.5 Measurement Reporting
5.5.5.1 General
FIG. 1 shows Measurement reporting.

The purpose of this procedure is to transfer measurement results from the UE to the network. The UE shall initiate this procedure only after successful security activation. For the measId for which the measurement reporting procedure was triggered, the UE shall set the measResults within the MeasurementReport message as follows:

1> set the measId to the measurement identity that triggered the measurement reporting;
1> set the measResultServingCell within measResultServingMOList to include RSRP, RSRQ and the available SINR for each configured serving cell derived based on the rsType indicated in the associated reportConfig;
1> set the measResultServingCell within measResultServingMOList to include for each NR serving cell that is configured with servingCellMO, if any, the servCellId;
1> if the reportConfig associated with the measId that triggered the measurement reporting includes reportQuantityRsIndexes and maxNrofRSIndexesToReport:
  2> for each serving cell configured with servingCellMO, include beam measurement information according to the associated reportConfig as described in 5.5.5.2;
1> if the reportConfig associated with the measId that triggered the measurement reporting includes reportAddNeighMeas:
  2> for each serving cell measObjectId referenced in the measIdList, other than the measObjectIdcorresponding with the measId that triggered the measurement reporting:
    3> set the measResultBestNeighCell within measResultServingMOList to include the physCellId and the available measurement quantities based on the reportQuantityCell and rsType indicated in reportConfig of the non-serving cell corresponding to the concerned measObjectNR with the highest measured RSRP if RSRP measurement results are available for cells corresponding to this measObjectNR, otherwise with the highest measured RSRQ if RSRQ measurement results are available for cells corresponding to this measObjectNR, otherwise with the highest measured SINR;
    3> if the reportConfig associated with the measId that triggered the measurement reporting includes reportQuantityRsIndexes and maxNrofRSIndexesToReport:
      4> for each best non-serving cell included in the measurement report:
        5> include beam measurement information according to the associated reportConfig as described in 5.5.5.2;
1> if there is at least one applicable neighbouring cell to report:
  2> set the measResultNeighCells to include the best neighbouring cells up to maxReportCells in accordance with the following:
    3> if the reportType is set to eventTriggered:
      4> include the cells included in the cellsTriggeredList as defined within the VarMeasReportList for this measId;
    3> else:
      4> include the applicable cells for which the new measurement results became available since the last periodical reporting or since the measurement was initiated or reset;
      4> if reportQuantityRsIndexes and maxNrofRSIndexesToReport are configured, include beam measurement information as described in 5.5.5.2;
    3> for each cell that is included in the measResultNeighCells, include the physCellId;
    3> if the reportType is set to eventTriggered:
      4> for each included cell, include the layer 3 filtered measured results in accordance with the reportConfig for this measId, ordered as follows:
        5> if the measObject associated with this measId concerns NR:
          6> if rsType in the associated reportConfig is set to ssb:
            7> set resultsSSB-Cell within the measResult to include the SS/PBCH block based quantity(ies) indicated in the reportQuantityCell within the concerned reportConfig, in order of decreasing trigger quantity, i.e. the best cell is included first:
              8> if reportQuantityRsIndexesand maxNrofRSIndexesToReport are configured, include beam measurement information as described in 5.5.5.2;
          6> else if rsType in the associated reportConfig is set to csi-rs:
            7> set resultsCSI-RS-Cell within the measResult to include the CSI-RS based quantity(ies) indicated in the reportQuantityCell within the concerned reportConfig, in order of decreasing trigger quantity, i.e. the best cell is included first:
              8> if reportQuantityRsIndexesand maxNrofRSIndexesToReport are, include beam measurement information as described in 5.5.5.2;
        5> if the measObject associated with this measId concerns E-UTRA:
          6> set the measResult to include the quantity(ies) indicated in the reportQuantity within the concerned reportConfigInterRAT in order of decreasing E-UTRA trigger quantity, i.e. the best cell is included first;
    3> if the reportType is set to periodical:
      4> if a single reporting quantity is set to TRUE in reportQuantityRsIndexes;
        5> consider the configured single quantity as the sorting quantity;
      4> else:
        5> if rsrp is set to TRUE;
          6> consider RSRP as the sorting quantity;
        5> else:
          6> consider RSRQ as the sorting quantity;
    3> if the reportType is set to reportCGI:
      4> if the cell indicated by cellForWhichToReportCGI is an NR cell:
        5> if all mandatory fields of the cgi-Info for the concerned cell have been obtained:
          6> include the plmn-IdentityInfoList including plmn-IdentityList, trackingAreaCode (if available), ranac (if available) and cellIdentity for each entry of the plmn-IdentityInfoList;
          6> include frequencyBandList if available;
        5> else if MIB indicates the SIB1 is not broadcast:
          6> include the noSIB1 including the ssb-SubcarrierOffset and pdcch-ConfigSIB1 obtained from MIB of the concerned cell;

-continued

```
    4> if the cell indicated by cellForWhichToReportCGI is an EUTRA cell:
        5> if all mandatory fields of the cgi-Info-EPC for the concerned cell have been
            obtained:
            6> include in the cgi-Info-EPC the fields broadcasted in EUTRA
                SystemInformationBlockType1 associated to EPC;
        5> if UE is E-UTRA/5GC capable and all mandatory fields of the cgi-Info-5GC for
            the concerned cell have been obtained:
            6> include in the cgi-Info-5GC the fields broadcasted in EUTRA
                SystemInformationBlockType1 associated to 5GC;
        5> include the freqBandIndicator;
        5> if the cell broadcasts the multiBandInfoList, include the multiBandInfoList;
        5> if the cell broadcasts the freqBandIndicatorPriority, include the
            freqBandIndicatorPriority;
1> increment the numberOfReportsSent as defined within the VarMeasReportList for this
    measId by 1;
1> stop the periodical reporting timer, if running;
1> if the numberOfReportsSent as defined within the VarMeasReportList for this measId is less
    than the reportAmount as defined within the corresponding reportConfig for this measId:
    2> start the periodical reporting timer with the value of reportInterval as defined within the
        corresponding reportConfig for this measId;
1> else:
    2> if the reportType is set to periodical:
        3> remove the entry within the VarMeasReportList for this measId;
        3> remove this measId from the measIdList within VarMeasConfig;
1> if the UE is configured with EN-DC:
    2> if SRB3 is configured:
        3> submit the MeasurementReport message via SRB3 to lower layers for transmission,
            upon which the procedure ends;
    2> else:
        3> submit the MeasurementReport message via the EUTRA MCG embedded in E-UTRA
            RRC message ULInformationTransferMRDC as specified in TS 36.331 [10].
1> else:
    2> submit the MeasurementReport message to lower layers for transmission, upon which the
        procedure ends.
```

5.5.5.2 Reporting of Beam Measurement Information
For beam measurement information to be included in a measurement report the UE shall:

```
1> if reportType is set to eventTriggered:
    2> consider the trigger quantity as the sorting quantity;
1> if reportType is set to periodical:
    2> if a single reporting quantity is set to TRUE in reportQuantityRsIndexes;
        3> consider the configured single quantity as the sorting quantity;
    2> else:
        3> if rsrp is set to TRUE;
            4> consider RSRP as the sorting quantity;
        3> else:
            4> consider RSRQ as the sorting quantity;
1> set rsIndexResults to include up to maxNrofRsIndexesToReportSS/PBCH block indexes or
    CSI-RS indexes in order of decreasing sorting quantity as follows:
    2> if the measurement information to be included is based on SS/PBCH block:
        3> include within resultsSSB-Indexes the index associated to the best beam for that
            SS/PBCH block sorting quantity and if absThreshSS-BlocksConsolidationis included
            in the VarMeasConfig for the corresponding measObject, the remaining beams whose
            sorting quantity is above absThreshSS-BlocksConsolidation defined in the
            VarMeasConfig for the corresponding measObject;
        3> if includeBeamMeasurements is configured, include the SS/PBCH based measurement
            results for the quantities in reportQuantityRsIndexes set to TRUE for each SS/PBCH
            blockindex;
    2> else if the beam measurement information to be included is based on CSI-RS:
        3> include within resultsCSI-RS-Indexes the index associated to the best beam for that
            CSI-RS sorting quantity and, if absThreshCSI-RS-Consolidation is included in the
            VarMeasConfig for the corresponding measObject, the remaining beams whose
            sorting quantity is above absThreshCSI-RS-Consolidation defined in the
            VarMeasConfig for the corresponding measObject;
3> if includeBeamMeasurementsis configured, include the CSI-RS based measurement results
    for the quantities in reportQuantityRsIndexes set to TRUE for each CSI-RS index.
```

ReportConfigNR

The IE ReportConfigNR specifies criteria for triggering of an NR measurement reporting event. Measurement reporting events are based on cell measurement results, which can either be derived based on SS/PBCH block or CSI-RS. These events are labelled AN with N equal to 1, 2 and so on.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2.

Event A6: Neighbour becomes amount of offset better than SCell.

```
ReportConfigNR information element

-- ASN1START
-- TAG-REPORT-CONFIG-START
ReportConfigNR ::=            SEQUENCE {
    reportType                CHOICE {
        periodical            PeriodicalReportConfig,
        eventTriggered        EventTriggerConfig,
        ...,
        reportCGI             ReportCGI
    }
}
ReportCGI ::=                 SEQUENCE {
    cellForWhichToReportCGI   PhysCellId,
    ...
}
EventTriggerConfig::=         SEQUENCE {
    eventId                   CHOICE {
        eventA1               SEQUENCE {
            a1-Threshold      MeasTriggerQuantity,
            reportOnLeave     BOOLEAN,
            hysteresis        Hysteresis,
            timeToTrigger     TimeToTrigger
        },
        eventA2               SEQUENCE {
            a2-Threshold      MeasTriggerQuantity,
            reportOnLeave     BOOLEAN,
            hysteresis        Hysteresis,
            timeToTrigger     TimeToTrigger
        },
        eventA3               SEQUENCE {
            a3-Offset
MeasTriggerQuantityOffset,
            reportOnLeave     BOOLEAN,
            hysteresis        Hysteresis,
            timeToTrigger     TimeToTrigger,
            useWhiteCellList  BOOLEAN
        },
        eventA4               SEQUENCE {
            a4-Threshold      MeasTriggerQuantity,
            reportOnLeave     BOOLEAN,
            hysteresis        Hysteresis,
            timeToTrigger     TimeToTrigger,
            useWhiteCellList  BOOLEAN
        },
        eventA5               SEQUENCE {
            a5-Threshold1     MeasTriggerQuantity,
            a5-Threshold2     MeasTriggerQuantity,
            reportOnLeave     BOOLEAN,
            hysteresis        Hysteresis,
            timeToTrigger     TimeToTrigger,
            useWhiteCellList  BOOLEAN
        },
        eventA6               SEQUENCE {
            a6-Offset
```

-continued

```
ReportConfigNR information element

MeasTriggerQuantityOffset,
            reportOnLeave     BOOLEAN,
            hysteresis        Hysteresis,
            timeToTrigger     TimeToTrigger,
            useWhiteCellList  BOOLEAN
        },
        ...
    },
    rsType                    NR-RS-Type,
    reportInterval            ReportInterval,
    reportAmount              ENUMERATED {r1, r2, r4, r8, r16,
r32, r64, infinity},
    reportQuantityCell        MeasReportQuantity,
    maxReportCells            INTEGER (1..maxCellReport,),
    reportQuantityRsIndexes   MeasReportQuantity
OPTIONAL, -- Need R
    maxNrofRSIndexesToReport  INTEGER
(1..maxNrofIndexesToReport)      OPTIONAL, -- Need R
    includeBeamMeasurements   BOOLEAN,
    reportAddNeighMeas        ENUMERATED {setup}
OPTIONAL, -- Need R
    ...
}
PeriodicalReportConfig ::=    SEQUENCE {
    rsType                    NR-RS-Type,
    reportInterval            ReportInterval,
    reportAmount              ENUMERATED {r1, r2, r4, r8, r16,
r32, r64, infinity},
    repotQuantityCell         MeasReportQuantity,
    maxReportCells            INTEGER (1..maxCellReport),
    reportQuantityRsIndexes   MeasReportQuantity
OPTIONAL, -- Need R
    maxNrofRsIndexesToReport  INTEGER
(1..maxNrofIndexesToReport)      OPTIONAL, -- Need R
    includeBeamMeasurements   BOOLEAN,
    useWhiteCellList          BOOLEAN,
    ...
}
NR-RS-Type ::=                ENUMERATED {ssb, csi-rs}
MeasTriggerQuantity ::=       CHOICE {
    rsrp                      RSRP-Range,
    rsrq                      RSRQ-Range,
    sinr                      SINR-Range
}
MeasTriggerQuantityOffset ::= CHOICE {
    rsrp                      INTEGER (-30..30),
    rsrq                      INTEGER (-30..30),
    sinr                      INTEGER (-30..30)
}
MeasReportQuantity ::=        SEQUENCE {
    rsrp                      BOOLEAN,
    rsrq                      BOOLEAN,
    sinr                      BOOLEAN
}
-- TAG-REPORT-CONFIG-START
-- ASN1STOP
```

In LTE, the network could configure the UE to report different measurements like RSRP, RSRQ and/or SINR by configuring them to be part of the reportQuantity in the report configuration. Several events can be configured as part of the reportConfigEUTRA. A1-A6 events were defined based on the cell level Intra LTE measurements. The UE would receive L3 filtered RSRP and RSRQ measurements on the serving and neighbouring cells for every measurement instance. Both RSRP and RSRQ (and SINR in release (Rel) 13) are part of the reportQuanitity in the reportConfigEUTRA. In LTE it is possible to request the UE to include only RSRP or RSRQ in the measurement report and it is also possible to request to include both and also SINR for Rel 13 UE onwards.

SUMMARY

Uplink coverage could be problematic, especially in mid-band and high-band deployments. It is also common to have more Synchronization Signal Block (SSB) beams in these frequencies to provide coverage. A network, i.e. a radio network node, may then typically configure the UE to report beam specific reports to enable reduced resource allocations e.g. contention free random access (CFRA), in the target cells. This will result in the increased measurement report size for the UE since the UE has to report also the beam specifics. If the UE is triggered to include both cell and beam level measurements in the measurement report, the size of the measurement report could become very large and the likelihood to successfully transmit the measurement report to the network in challenging radio conditions (in the serving cell) will then be negatively impacted, with increased risks for radio link failures and lost connections.

When a UE is triggered to send a measurement report due to that the radio conditions in the serving cell have suddenly become worse, there may then be several cells that should be included in the measurement report since they all have become sufficiently better than the serving cell. In such a scenario, it will be problematic to successfully transmit the measurement report to the network since the size of it is large and the radio conditions in the serving cell are poor resulting in a limited performance of the wireless communication network.

An object of embodiments herein is to provide a mechanism that improves performance in the wireless communication network.

According to an aspect the object is achieved by providing a method performed by a UE for handling signal measurements e.g. reporting measurements. The UE may measure signal strength or signal quality of a signal from a radio network node. The UE determines whether one or more conditions are fulfilled for indicating that a radio condition is below a certain level. In response to that one or more conditions are fulfilled and thereby indicating that the radio condition is below a threshold, the UE transmits a report with restricted content. E.g. in response to fulfilling the one or more conditions indicating that the radio condition is below a threshold, the UE transmits the report with restricted content. Thus, in case the one or more conditions are fulfilled and thereby it is indicated a radio condition of a low level, the UE may transmit a report of reduced size.

According to another aspect the object is achieved by providing a method performed by radio network node for configuring a UE in a wireless communication network. The radio network node transmits configuration data to the UE, wherein the configuration data comprises one or more conditions defining when to transmit a report indicating radio condition being below a threshold, wherein the report is with restricted content. E.g. the radio network node may transmit the configuration data, wherein the configuration data comprises one or more conditions defining when to transmit a measurement report of reduced size.

According to still another aspect the object is achieved by providing a UE for handling signal measurements, wherein the UE is configured to determine whether one or more conditions are fulfilled for indicating that a radio condition is below a certain level. In response to that the one or more conditions are fulfilled and thereby indicating the radio condition being below a threshold, the UE is configured to transmit a report with restricted content.

According to still another aspect the object is achieved by providing a radio network node for configuring a UE in a wireless communication network. The radio network node is configured to transmit configuration data to the UE, wherein the configuration data comprises one or more conditions defining when to transmit a report indicating radio condition being below a threshold, wherein the report is with restricted content.

It is furthermore provided herein a computer program product comprising instructions, which, when executed on at least one processor, cause the at least one processor to carry out any of the methods above, as performed by the radio network node, or the UE, respectively. It is additionally provided herein a computer-readable storage medium, having stored thereon a computer program product comprising instructions which, when executed on at least one processor, cause the at least one processor to carry out the method according to any of the methods above, as performed by the radio network node, or the UE, respectively.

Embodiments herein propose that content of the report, such as a measurement report, is restricted in case of a condition is fulfilled indicating challenging radio conditions to enable successful transmission of the report to the radio network node.

When a UE is triggered to send e.g. a measurement report and the radio conditions in e.g. the serving cell may be poor, the UE may then exclude some of the information from the measurement report message, which the UE otherwise would need to include. Since the UE, when certain one or more conditions are fulfilled, may report one or more measurements in a report of reduced size the measurement may be received instead of being lost leading to an improved performance of the wireless communication network.

Thus, embodiments herein increase the probability of successful transmission of reports at e.g. challenging radio conditions in the serving cell. This will lead to a decrease in interruptions and lost connections for UEs and thus improves performance of the wireless communication network.

BRIEF DESCRIPTION OF THE DRAWINGS

Embodiments will now be described in more detail in relation to the enclosed drawings, in which:

FIG. 7 is a block diagram depicting a UE according to embodiments herein;

FIGS. 11-14 are flowcharts illustrating methods implemented in a communication system including a host computer, a base station and a user equipment.

DETAILED DESCRIPTION

Embodiments herein are described within the context of 3GPP NR radio technology (3GPP TS 38.300 V15.2.0 (2018-06)). It is understood, that the problems and solutions described herein are equally applicable to wireless access networks and user-equipments (UEs) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 2:
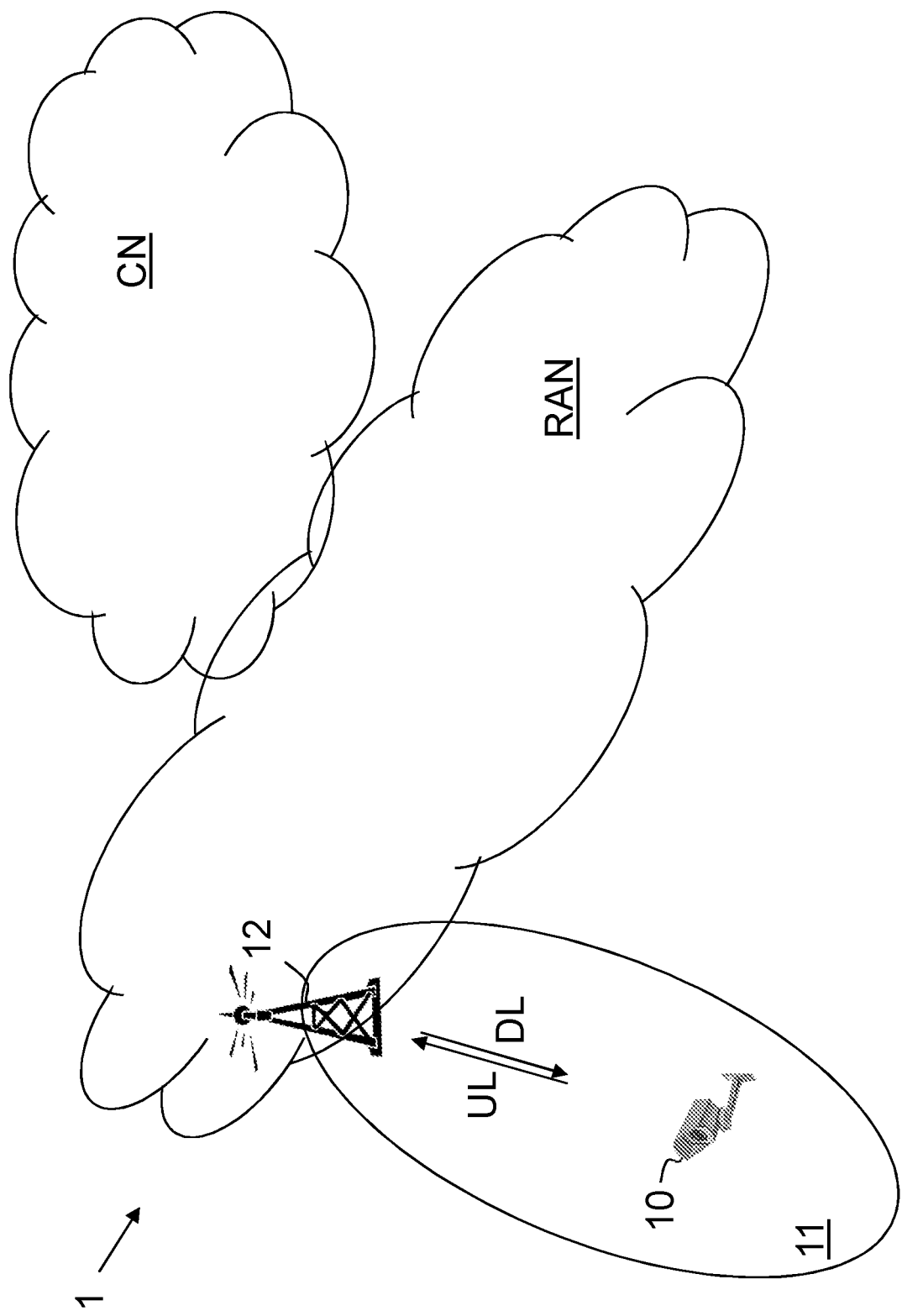
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies, such as NR, Wi-Fi, Long Term Evolution (LTE), LTE-Advanced, Fifth Generation (5G), Wideband Code Division Multiple Access (VVCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a context of NR, however, embodiments are also applicable in further development of the existing wireless communication systems such as e.g. WCDMA and LTE.

In the wireless communication network 1, wireless devices also known as UEs e.g. a UE 10 such as a mobile station, a non-access point (non-AP) station (STA), a STA, a communication device and/or a wireless terminal, communicate via one or more Access Networks (AN), e.g. RAN, to one or more core networks (CN). It should be understood by the skilled in the art that "UE" is a non-limiting term which means any terminal, wireless communication terminal, wireless device, Machine Type Communication (MTC) device, Device to Device (D2D) terminal, internet of things (IoT) operable device, or node e.g. smart phone, laptop, mobile phone, sensor, camera, relay, mobile tablets or even a small base station capable of communicating using radio communication with a network node within an area served by the network node.

The wireless communication network 1 comprises a radio network node 12 providing radio coverage over a geographical area, a first service area 11, of a radio access technology (RAT), such as NR or similar. The radio network node 12 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE within the area served by the radio network node 12 depending e.g. on the first radio access technology and terminology used. The radio network node 12 may alternatively or additionally be a controller node or a packet processing node such as a radio controller node or similar. The radio network node may be referred to as a serving network node wherein the first cell may be referred to as a serving cell, and the serving network node communicates with the UE 10 in form of DL transmissions to the UE 10 and UL transmissions from the UE 10.

It should be noted that a service area may be denoted as cell, beam, beam group or similar to define an area of radio coverage.

The radio network node 12 may transmit reference signals (RS), such as cell specific reference signals (CRS), over the cell. Hence, the radio network node 12 may transmit reference signals for mobility purposes of UEs, such as CRS or beam reference signals (BRS), repeatedly, in time, in a large number of different directions using as many Tx-beams as deemed necessary to cover an operational area of the radio network node. Hence the radio network node 12 provides radio coverage over the cell using e.g. a first reference signal, e.g. first CRS, for identifying the first service area 11 in the wireless communication network.

Note that in a general scenario the term "radio network node" can be substituted with "transmission point". Distinction between the transmission points (TPs) may typically be based on CRSs or different synchronization signals transmitted. Several TPs may be logically connected to the same radio network node but if they are geographically separated, or are pointing in different propagation directions, the TPs may be subject to the same mobility issues as different radio network nodes. In subsequent sections, the terms "radio network node" and "TP" can be thought of as interchangeable.

Embodiments herein propose that content of a report related to signal measurements performed by the UE 10 is restricted in case of one or more conditions are fulfilled thus indicating challenging radio conditions. This is to enable successful transmission of the report to the radio network node 12.

Figure 3:
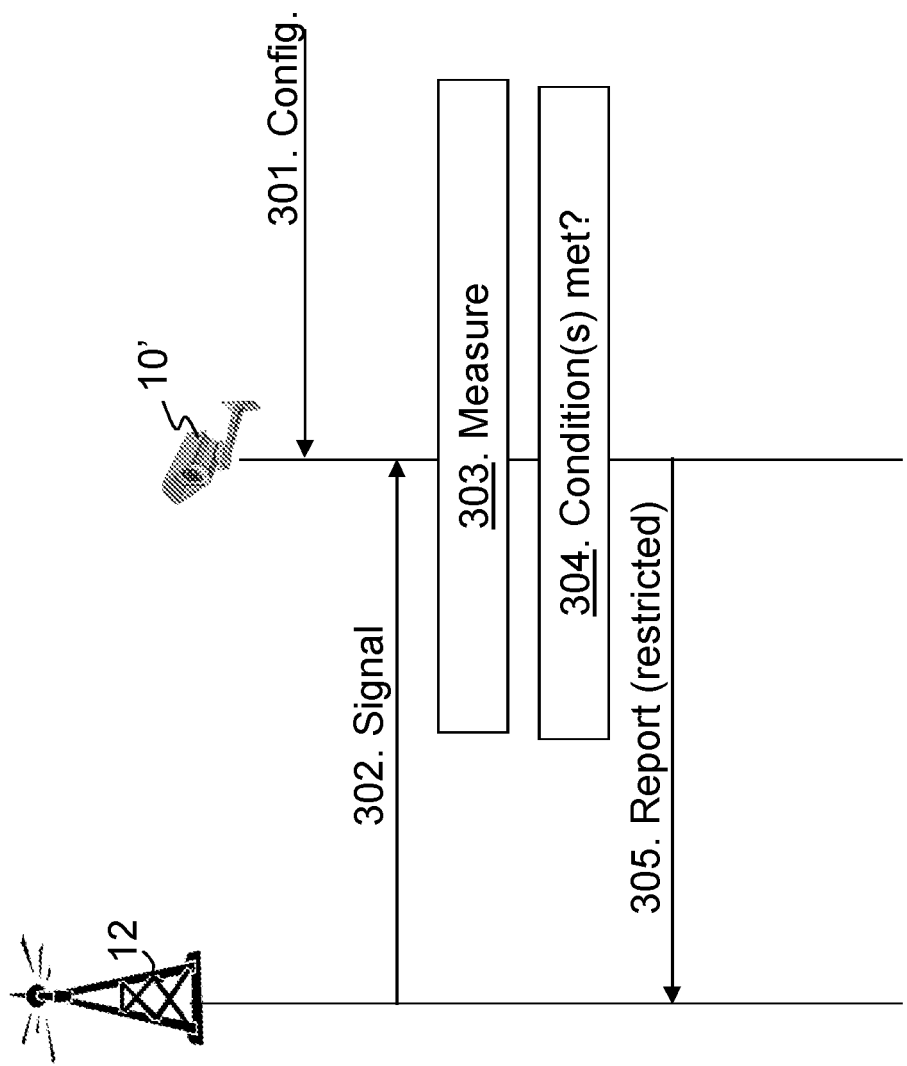
FIG. 3 is a combined signalling scheme and flowchart according to embodiments herein.

FIG. 3 is a combined flowchart and signalling scheme according to embodiments herein. The actions may be performed in any suitable order.

Action 301. The radio network node 12 that may be the serving radio network node may configure UEs e.g. the UE 10, to transmit the report of measurement of a reduced size. The configuration of the one or more conditions under which the UE 10 transmits such a measurement report with restricted content e.g. reduced size may be included in broadcasted information, directly configured to the UE 10, specified or hard coded.

Action 302. The radio network node 12 transmits signals and/or beams e.g. reference signals such as cell specific reference signals (CRS) or BRSs.

Action 303. The UE 10 may measure signal strength or signal quality e.g. RSRP, RSRQ, SINR, or signal to noise ratio (SNR) of respective signal.

Action 304. The UE 10 determines whether one or more conditions are fulfilled or met. When the one or more conditions are fulfilled this indicates that the radio condition for the UE 10 is below a threshold or a level. A condition may be related to the measured signal strength or quality e.g. whether being below a set threshold.

Action 305. In response to that the one or more conditions are fulfilled the UE 10 transmit the report of restricted content e.g. reduced size.

It should be noted that the radio network node 12 being the serving radio network node that receives the report with restricted content may also inform a target radio network node about the UE's reduced measurement report (reduced- MeasReport). This will aid the target radio network node to allocate contention free random access resources in more beams despite the UE not reporting beam level measurements. Furthermore, if the radio network node 12 serves a number of cells, the serving cell that receives the reduced measurement report may also inform the target cell about the UE's reduced measurement report (reducedMeasReport). This will aid the target cell to allocate contention free random access resources in more beams despite the UE not reporting beam level measurements.

Embodiments herein disclose a method to transmit a report of measurements wherein the report is of restricted content such as reduced size.

In a first embodiment the UE 10 excludes some parts of the information from the measurement report when the radio conditions in the serving cell are considered poor. The UE 10 does then only include e.g. a subset of the information in the measurement report compared to what it otherwise would have included in the measurement report based on measurement configurations. The one or more conditions under which the UE 10 transmits such a measurement report with reduced size and/or content are configured by the radio network node 12 through e.g. dedicated signalling to the UE 10, such as in a measurement configuration.

As an alternative, the configuration of the one or more conditions under which the UE 10 transmits such a measurement report with e.g. reduced size is included in broadcasted information, directly configured to the UE 10, specified or hard coded.

Additionally or alternatively, the one or more conditions that trigger the UE 10 to send measurement reports with reduced size and/or restricted content are based on the radio condition in the serving cell (e.g. one or more of RSRP/RSRQ/SINR values below a threshold), where the UE 10 shall send the measurement report to the network. The radio condition may be based on the UL radio conditions that are available for the UE, which in case of e.g. an NR/5G system may be dependent on whether the UE has a Supplementary UL (SUL) carrier configured or not. SUL is used to extend UL coverage when radio condition gets poorer than a certain criteria.

As an alternative the conditions that trigger the UE 10 to send measurement reports with reduced size and/or restricted content may be based on that the UE 10 is experiencing problems with the radio quality in the serving cell. As an example, if the UE 10 has failed its transmission of the measurement report, e.g. the one with the non-reduced content, a certain number of times the UE 10 may send the report with the restricted content. The thresholds for the number of failed transmission attempts for the measurement report may then be configured by the radio network node 12 (either through dedicated or broadcasted signaling), specified, hard coded or directly configured to the UE 10.

As another or additional alternative, the one or more conditions that trigger the UE 10 to send the measurement report with restricted content may be based on the difference in radio quality between the serving cell and one or more neighbour cell(s) that are to be included in the measurement report. If the difference in e.g. SINR value between the neighbour cell(s) and serving cell are such that the neighbour cell(s) is/are at least a certain threshold Thr_SINR_diff better than the serving cell, the one or more conditions are considered fulfilled. Yet another alternative is that the one or more conditions are based on the number of neighbour cells that are better than the serving cells. If there are more than Thr_number_of_better_neighbour_cells neighbour cells that have sufficiently better radio conditions than the serving cell, the UE 10 may then send measurement reports with restricted content.

Alternatively or additionally, the condition(s) that trigger the UE 10 to send measurement reports with restricted content may be based on the difference in radio conditions for the different cells and/or beams that are to be included in the measurement report. If e.g. a number of cells are fulfilling the configured criteria for being included in the measurement report (and thus should be included), but a subset of these cells are Thr_SINR_diff_Nghb better than others cells, only those better cells are included in the measurement report. As an example, if there are 3 cells that should be included in the measurement report based on the measurement configuration but the best cell is then at least Thr_SINR_diff_ Nghb better than the other cells, only the best cell is included in the measurement report.

Alternatively or additionally, the reduction in size of the measurement report consists of that some information, which the UE 10 otherwise would include in the measurement report based on the measurement configuration, is excluded from the measurement report. As an example, if more than one (neighbour) cell fulfill the criteria for being reported, the UE 10 then only includes information for a subset of those cells, e.g. only for the best cell. In another example, if the UE 10 is configured to include measurement information on beam level for one or more cell(s), the UE 10 does then exclude some or all of that beam level information. As an alternative, the information to include in the measurement report can be configured by the network. The network can then e.g. configure to prioritize measurements for certain cells and/or beams when there is a need to reduce the size of the measurement report.

An example as to how the configuration data based on embodiments herein may be captured in the specification is given below (underlined text shows the example implementation of embodiments herein).

Figure 1:
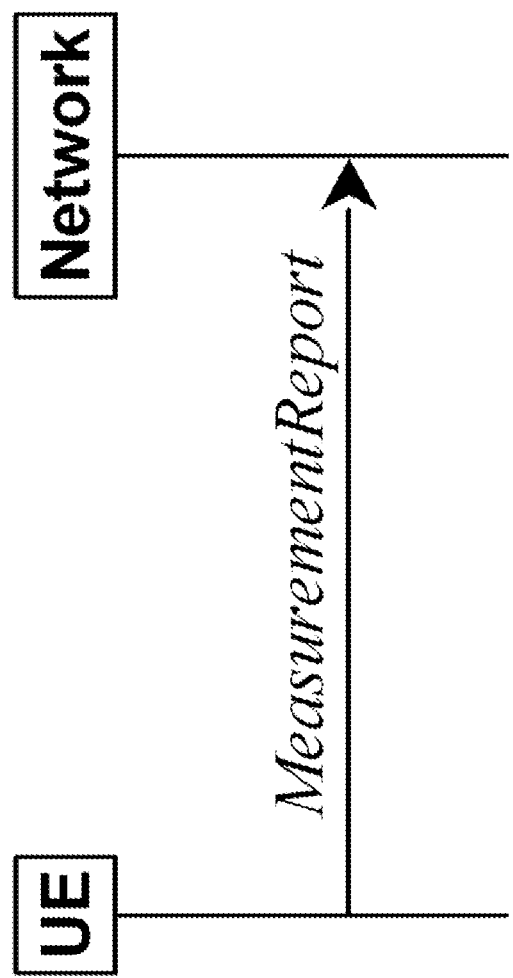
FIG. 1 shows measurement reporting according to prior art.

1.1.1 5.5.5 Measurement Reporting
1.1.1.1 5.5.5.1 General
FIG. 1: Measurement reporting
The purpose of this procedure is to transfer measurement results from the UE to the network. The UE shall initiate this procedure only after successful security activation. For the measId for which the measurement reporting procedure was triggered, the UE shall set the measResults within the MeasurementReport message as follows:

---

1> set the measId to the measurement identity that triggered the measurement reporting;
1> set the measResultServingCell within measResultServingMOList to include RSRP, RSRQ and the available SINR for each configured serving cell derived based on the rsType indicated in the associated reportConfig;
1> set the measResultServingCell within measResultServingMOList to include for each NR serving cell that is configured with servingCellMO, if any, the servCellId;
1> if the reportConfig associated with the measId that triggered the measurement reporting includes reportQuantityRsIndexes and maxNrofRSIndexesToReport:
  2> if the reportConfig associated with the measId that triggered the measurement reporting includes reportSizeReductionCondition and is set to RSRPthresholdBased:
    3> if the reportConfig associated with the measId that triggered the measurement reporting includes reportSizeReduction Threshold and is set to RSRP:
      4> if measResultServingCell of PSCell is above reportSizeReductionThreshold:
        5> for each serving cell configured with servingCellMO, include beam measurement information according to the associated reportConfig as described in 5.5.5.2;

```
        4> else:
            5> set reducedMeasReport to TRUE;
        3> else:
            4> for each serving cell configured with servingCellMO, include
                beam measurement information according to the associated
                reportConfig as described in 5.5.5.2;
    2> else:
        3> for each serving cell configured with servingCellMO, include
            beam measurement information according to the associated
            reportConfig as described in 5.5.5.2;
1> if the reportConfig associated with the measId that triggered the
    measurement reporting includes reportAddNeighMeas:
    2> for each serving cell measObjectId referenced in the measIdList,
        other than the measObjectIdcorresponding with the measId that
        triggered the measurement reporting:
        3> set the measResultBestNeighCell within
            measResultServingMOList to include the physCellId and the
            available measurement quantities based on the
            reportQuantityCelland rsTypeindicated in reportConfig of
            the non-serving cell corresponding to the concerned
            measObjectNRwith the highest measured RSRP if RSRP
            measurement results are available for cells corresponding to
            this measObjectNR, otherwise with the highest measured RSRQ
            if RSRQ measurement results are available for cells corresponding
            to this measObjectNR, otherwise with the highest measured SINR;
        3> if the reportConfig associated with the measId that triggered the
            measurement reporting includes reportQuantityRsIndexes and
            maxNrofRSIndexesToReport:
            4> for each best non-serving cell included in the measurement
                report:
                5> if the reportConfig associated with the measId that triggered
                    the measurement reporting includes
                    reportSizeReductionCondition and is set to
                    RSRPthresholdBased:
                    6> if the reportConfig associated with the measId that
                        triggered the measurement reporting includes
                        reportSizeReductionThreshold and is set to RSRP:
                        7> if measResultServingCell of PSCell is above
                            reportSizeReductionThreshold;
                            8> include beam measurement information according
                                to the associated reportConfig as described in 5.5.5.2;
                        7> else:
                            8> set reducedMeasReport to TRUE;
                    6> else:
                        7> include beam measurement information according to the
                            associated reportConfig as described in 5.5.5.2:
                5> else:
                    6> include beam measurement information according to the
                        associated reportConfig as described in 5.5.5.2;
1> if there is at least one applicable neighbouring cell to report:
    2> set the measResultNeighCells to include the best neighbouring cells
        up to maxReportCells in accordance with the following:
        3> if the report Type is set to eventTriggered:
            4> include the cells included in the cellsTriggeredList as defined
                within the VarMeasReportList for this measId;
        3> else:
            4> include the applicable cells for which the new measurement
                results became available since the last periodical reporting or
                since the measurement was initiated or reset;
            4> if reportQuantityRsIndexesand maxNrofRSIndexesToReport
                are configured;
                5> if the reportConfig associated with the measId that triggered
                    the measurement reporting includes
                    reportSizeReductionCondition and is set to
                    RSRPthresholdBased:
                    6> if the reportConfig associated with the measId that
                        triggered the measurement reporting includes
                        reportSizeReductionThreshold and is set to RSRP:
                        7> if measResultServingCell of PSCell is above
                            reportSizeReductionThreshold;
                            8> include beam measurement information as
                                described in 5.5.5.2.
                        7> else:
                            8> set reducedMeasReport to TRUE;
                    6> include beam measurement information as described
                        in 5.5.5.2:
                5> else:
                    6> include beam measurement information as described
                        in 5.5.5.2;
        3> for each cell that is included in the measResultNeighCells, include
            the physCellId;
        3> if the reportType is set to eventTriggered:
            4> for each included cell, include the layer 3 filtered measured
                results in accordance with the reportConfig for this measId,
                ordered as follows:
                5> if the measObject associated with this measId concerns NR:
                    6> if rsType in the associated reportConfig is set to ssb:
                        7> set resultsSSB-Cell within the measResult to include the
                            SS/PBCH block based quantity(ies) indicated in the
                            reportQuantityCell within the concerned reportConfig,
                            in order of decreasing trigger quantity, i.e. the best cell
                            is included first:
                        8> if reportQuantityRsIndexesand
                            maxNrofRSIndexesToReport are configured;
                            9> if the reportConfig associated with the measId
                                that triggered the measurement reporting includes
                                reportSizeReductionCondition and is set to
                                RSRPthresholdBased:
                                10> if the reportConfig associated with the
                                    measId that triggered the measurement reporting
                                    includes reportSizeReductionThreshold and is
                                    set to RSRP:
                                    11> if measResultServingCell of PSCell is
                                        above reportSizeReductionThreshold;
                                        12> include beam measurement information
                                            as described in 5.5.5.2;
                                    11> else:
                                        12> set reducedMeasReport to TRUE;
                                10> else:
                                    11> include beam measurement information as
                                        described in 5.5.5.2:
                            9> else:
                                10> include beam measurement information as
                                    described in 5.5.5.2;
                    6> else if rsType in the associated reportConfig is set to csi-rs:
                        7> set resultsCSI-RS-Cell within the measResult to include
                            the CSI-RS based quantity(ies) indicated in the
                            reportQuantityCell within the concerned reportConfig,
                            in order of decreasing trigger quantity, i.e. the best cell
                            is included first:
                        8> if reportQuantityRsIndexesand
                            maxNrofRSIndexesToReport are configured;
                            9> if the reportConfig associated with the measId
                                that triggered the measurement reporting includes
                                reportSizeReductionCondition and is set to
                                RSRPthresholdBased:
                                10> if the reportConfig associated with the
                                    measId that triggered the measurement
                                    reporting includes reportSizeReduction
                                    Threshold and is set to RSRP:
                                    11> if measResultServingCell of PSCell is
                                        above reportSizeReductionThreshold;
                                        12> include beam measurement information
                                            as described in 5.5.5.2;
                                    11> else;
                                        12> set reducedMeasReport to TRUE;
                                10> else:
                                    11> include beam measurement information as
                                        described in 5.5.5.2:
                            9> else:
                                10> include beam measurement information as
                                    described in 5.5.5.2;
                5> if the measObject associated with this measId concerns
                    E-UTRA:
                    6> set the measResult to include the quantity(ies) indicated in
                        the reportQuantity within the concerned
                        reportConfigInterRAT in order of decreasing E-UTRA
                        trigger quantity, i.e. the best cell is included first;
        3> if the report Type is set to periodical:
            4> if a single reporting quantity is set to TRUE in
                reportQuantityRsIndexes;
                5> consider the configured single quantity as the sorting quantity;
            4> else:
                5> if rsrp is set to TRUE;
                    6> consider RSRP as the sorting quantity;
                5> else:
                    6> consider RSRQ as the sorting quantity;
```

3> if the report Type is set to reportCGI:
    4> if the cell indicated by cellForWhichToReportCGI is an NR cell:
        5> if all mandatory fields of the cgi-Info for the concerned cell have been obtained:
            6> include the plmn-IdenfityInfoList including plmn-IdentityList, trackingAreaCode (if available), ranac (if available) and cellIdentity for each entry of the plmn-IdenfityInfoList;
            6> include frequencyBandList if available;
        5> else if MIB indicates the SIB1 is not broadcast:
            6> include the noSIB1 including the ssb-SubcarrierOffset and pdcch-ConfigSIB1 obtained from MIB of the concerned cell;
    4> if the cell indicated by cellForWhichToReportCGI is an EUTRA cell:
        5> if all mandatory fields of the cgi-Info-EPC for the concerned cell have been obtained:
            6> include in the cgi-Info-EPC the fields broadcasted in EUTRA SystemInformationBlockType1 associated to EPC;
        5> if UE is E-UTRA/5GC capable and all mandatory fields of the cgi-Info-5GC for the concerned cell have been obtained:
            6> include in the cgi-Info-5GC the fields broadcasted in EUTRA SystemInformationBlockType1 associated to 5GC;
        5> include the freqBandIndicator,
        5> if the cell broadcasts the multiBandInfoList, include the multiBandInfoList;
        5> if the cell broadcasts the freqBandIndicatorPriority, include the freqBandIndicatorPriority;
1> increment the numberOfReportsSent as defined within the VarMeasReportList for this measId by 1;
1> stop the periodical reporting timer, if running;
1> if the numberOfReportsSent as defined within the VarMeasReportList for this measId is less than the reportAmount as defined within the corresponding reportConfig for this measId:
    2> start the periodical reporting timer with the value of reportInterval as defined within the corresponding reportConfig for this measId;
1> else:
    2> if the reportType is set to periodical:
        3> remove the entry within the VarMeasReportList for this measId;
        3> remove this measId from the measIdList within VarMeasConfig;
1> if the UE is configured with EN-DC:
    2> if SRB3 is configured:
        3> submit the MeasurementReport message via SRB3 to lower layers for transmission, upon which the procedure ends;
    2> else:
        3> submit the MeasurementReport message via the EUTRA MCG embedded in E-UTRA RRC message ULInformationTransfer-MRDC as specified in TS 36.331 [10].
1> else:
    2> submit the MeasurementReport message to lower layers for transmission, upon which the procedure ends.

1.1.1.2 5.5.5.2 Reporting of Beam Measurement Information

For beam measurement information to be included in a measurement report the UE shall:

1> if report Type is set to eventTriggered:
    2> consider the trigger quantity as the sorting quantity;
1> if report Type is set to periodical:
    2> if a single reporting quantity is set to TRUE in reportQuantityRsIndexes;
        3> consider the configured single quantity as the sorting quantity;
    2> else:
        3> if rsrp is set to TRUE;
            4> consider RSRP as the sorting quantity;
        3> else:
            4> consider RSRQ as the sorting quantity;
1> set rsIndexResults to include up to maxNrofRsIndexesToReportSS/PBCH block indexes or CSI-RS indexes in order of decreasing sorting quantity as follows:
    2> if the measurement information to be included is based on SS/PBCH block:
        3> include within resultsSSB-Indexes the index associated to the best beam for that SS/PBCH block sorting quantity and if absThreshSS-BlocksConsolidationis included in the VarMeasConfig for the corresponding measObject, the remaining beams whose sorting quantity is above absThreshSS-BlocksConsolidation defined in the VarMeasConfig for the corresponding measObject;
        3> if includeBeamMeasurements is configured, include the SS/PBCH based measurement results for the quantities in reportQuantityRsIndexes set to TRUE for each SS/PBCH blockindex;
    2> else if the beam measurement information to be included is based on CSI-RS:
        3> include within resultsCSI-RS-Indexes the index associated to the best beam for that CSI-RS sorting quantity and, if absThreshCSI-RS-Consolidation is included in the VarMeasConfig for the corresponding measObject, the remaining beams whose sorting quantity is above absThreshCSI-RS-Consolidation defined in the VarMeasConfig for the corresponding measObject;
        3> if includeBeamMeasurementsis configured, include the CSI-RS based measurement results for the quantities in reportQuantityRsIndexes set to TRUE for each CSI-RS index.

End of First Changes

1.1.2 6.3.2 Radio resource control information elements

Unaffected IEs are not included

Start of Second Changes

1.1.2.1—MeasResults

The IE MeasResults covers measured results for intra-frequency, inter-frequency, and inter-RAT mobility.

| MeasResults information element |
|---|
| -- ASN1START |
| -- TAG-MEAS-RESULTS-START |
| MeasResult ::=  SEQUENCE { |
|   measId  MeasId, |
|   measResultServingMOList  MeasResultServMOList, |
|   measResultNeighCells  CHOICE { |
|     measResultListNR  MeasResultListNR |
|     ..., |
|     measResultListEUTRA  MeasResultListEUTRA |
|   } |
| OPTIONAL, |
| [[ |
|   reducedMeasReport  BOOLEAN, |
| ]] |
| ... |
| } |
| MeasResultServMOList ::=  SEQUENCE (SIZE (1..maxNrofServingCells)) OF MeasResultServMO |
| MeasResultServMO ::=  SEQUENCE { |
|   servCellId  ServCellIndex, |
|   measResultServingCell  MeasResultNR, |
|   measResultBestNeighCell  MeasResultNR |
| OPTIONAL, |
|   ... |
| } |
| MeasResultListNR ::=  SEQUENCE (SIZE (1..maxCellReport)) OF MeasResultNR |
| MeasResultNR ::=  SEQUENCE { |
|   physCellId  PhysCellId |
| OPTIONAL, |
|   measResult  SEQUENCE { |
|     cellResults  SEQUENCE{ |
|       resultsSSB-Cell  MeasQuantityResults |
| OPTIONAL, |
|       resultsCSI-RS-Cell  MeasQuantityResults |
| OPTIONAL |
|     }, |

-continued

| MeasResults information element | |
|---|---|
| rsIndexResults | SEQUENCE{ |
|   resultsSSB-Indexes | ResultsPerSSB-IndexList |
| OPTIONAL, | |
|   resultsCSI-RS-Indexes | ResultsPerCSI-RS-IndexList |
| OPTIONAL | |
| } | |
| OPTIONAL | |
| }, | |
| ..., | |
| [[ | |
| cgi-Info | CGI-Info |
| OPTIONAL | |
| ]] | |
| } | |
| MeasResultListEUTRA ::= | SEQUENCE (SIZE (1.. maxCellReport)) OF MeasResultEUTRA |
| MeasResultEUTRA ::= | SEQUENCE { |
|   physCellId | PhysCellId, |
|   measResult | MeasQuantityResultsEUTRA, |
|   cgi-Info | SEQUENCE { |
|     cgi-info-EPC | SEQUENCE { |
|       cgi-info-EPC-legacy | CellAccessRelatedInfo-EUTRA-EPC, |
|       cgi-info-EPC-list | SEQUENCE (SIZE (1.. maxPLMN)) OF CellAccessRelatedInfo-EUTRA-EPC OPTIONAL |
|     } OPTIONAL, | |
|     cgi-info-5GC | SEQUENCE (SIZE (1.. maxPLMN)) OF CellAccessRelatedInfo-EUTRA-5GC OPTIONAL, |
|     freqBandIndicator | FreqBandIndicatorEUTRA, |
|     multiBandInfoList | MultiBandInfoListEUTRA OPTIONAL, |
|     freqBandIndicatorPriority | ENUMERATED {true} OPTIONAL |
|   } | |
| OPTIONAL, | |
| ... | |
| } | |
| MultiBandInfoListEUTRA ::= | SEQUENCE (SIZE (1.. maxMultiBands)) OF FreqBandIndicatorEUTRA |
| MeasQuantityResults ::= | SEQUENCE { |
|   rsrp | RSRP-Range |
| OPTIONAL, | |
|   rsrq | RSRQ-Range |
| OPTIONAL, | |
|   sinr | SINR-Range |
| OPTIONAL | |
| } | |
| MeasQuantityResultsEUTRA ::= | SEQUENCE { |
|   rsrp | RSRP-RangeEUTRA |
| OPTIONAL, | |
|   rsrq | RSRQ-RangeEUTRA |
| OPTIONAL, | |
|   sinr | SINR-RangeEUTRA |
| OPTIONAL | |
| } | |
| ResultsPerSSB-IndexList::= | SEQUENCE (SIZE (1..maxNrofIndexesToReport2)) OF ResultsPerSSB-Index |
| ResultsPerSSB-Index ::= | SEQUENCE { |
|   ssb-Index | SSB-Index, |
|   ssb-Results | MeasQuantityResults |
| OPTIONAL | |
| } | |
| ResultsPerCSI-RS-IndexList::= | SEQUENCE (SIZE (1..maxNrofIndexesToReport2)) OF ResultsPerCSI-RS-Index |
| ResultsPerCSI-RS-Index ::= | SEQUENCE { |
|   csi-RS-Index | CSI-RS-Index, |
|   csi-RS-Results | MeasQuantityResults |
| OPTIONAL | |
| } | |
| -- TAG-MEAS-RESULTS-STOP | |
| -- ASN1STOP | |

| MeasResultServFreq field descriptions |
|---|
| measResultBestNeighCell |
| Measured results of the best detected neighbour cell on the corresponding serving frequency. |
| cgi-info-EPC-legacy |
| This field includes the cellAccessRelatedInfo of 36.331 [X]. |
| cgi-info-EPC-list |
| This field includes the cellAccessRelatedInfoList-r14 of 36.331 [X]. |
| MeasResults field descriptions |
| csi-rs-Index |
| CSI-RS resource index associated to the measurement information to be reported. |
| measId |
| Identifies the measurement identity for which the reporting is being performed. |
| measResult |
| Measured results of an NR cell. |
| measResultListNR |
| List of measured results for the maximum number of reported best cells for an NR measurement identity. |
| measResultServingMOList |
| Measured results of measured cells with reference signals indicated in the serving cell measurement objects including measurement results of SpCell, configured SCell(s) and best neighbouring cell within measured cells with reference signals indicated in on each serving cell measurement object. |
| resultsCSI-RS-Indexes |
| List of measurement information per CSI-RS resource index of an NR cell. |
| resultsSSB-Indexes |
| List of measurement information per SS/PBCH index of an NR cell. |
| results CSI-RS-Cell |
| Cell level measurement results (e.g. RSRP, RSRQ, SINR) to be reported derived from CSI-RS measurements. |
| resultsSSB-Cell |
| Cell level measurement results (e.g. RSRP, RSRQ, SINR) to be reported derived on SS/PBCH block measurements. |
| rsrp |
| Measured SS-RSRP or CSI-RSRP results as defined in TS 38.215 [9], either per NR cell from the L1 filter(s) or per (SS/PBCH)/(CSI-RS) index as specified in 5.5.3.3a. |
| rsrq |
| Measured SS-RSRQ or CSI-RSRQ results as defined in TS 38.215 [9], either per NR cell from the L1 filter(s) or per (SS/PBCH)/(CSI-RS) index as specified in 5.5.3.3a. |
| sinr |
| Measured SS-SINR or CSI-SINR results as defined in TS 38.215 [9], either per NR cell from the L1 filter(s) or per (SS/PBCH)/(CSI-RS) index as specified in 5.5.3.3a. |
| ssb-Index |
| SS/PBCH block index associated to the measurement information to be reported. |

Editor's Note: FFS locationInfo.

End of Second Changes

Unaffected IEs are skipped

Start of Third Changes 1.1.2.2—ReportConfigNR

The IE ReportConfigNR specifies criteria for triggering of an NR measurement reporting event. Measurement reporting events are based on cell measurement results, which can either be derived based on SS/PBCH block or CSI-RS. These events are labelled AN with N equal to 1, 2 and so on.

Event A1: Serving becomes better than absolute threshold;
Event A2: Serving becomes worse than absolute threshold;
Event A3: Neighbour becomes amount of offset better than PCell/PSCell;
Event A4: Neighbour becomes better than absolute threshold;
Event A5: PCell/PSCell becomes worse than absolute threshold1 AND Neighbour/SCell becomes better than another absolute threshold2.

Event A6: Neighbour becomes amount of offset better than SCell.

| ReportConfigNR information element |
|---|

```
-- ASN1START
-- TAG-REPORT-CONFIG-START
ReportConfigNR ::=                      SEQUENCE {
  reportType                              CHOICE {
    periodical                              PeriodicalReportConfig,
    eventTriggered                          EventTriggerConfig,
    ...,
    reportCGI                               ReportCGI
  }
}
ReportCGI ::=                           SEQUENCE {
  cellForWhichToReportCGI                 PhysCellId,
  ...
}
EventTriggerConfig::=                   SEQUENCE {
  eventId                                 CHOICE {
    eventA1                                 SEQUENCE {
      a1-Threshold                            MeasTriggerQuantity,
      reportOnLeave                           BOOLEAN,
      hysteresis                              Hysteresis,
      timeToTrigger                           TimeToTrigger
    },
    eventA2                                 SEQUENCE {
      a2-Threshold                            MeasTriggerQuantity,
      reportOnLeave                           BOOLEAN,
      hysteresis                              Hysteresis,
      timeToTrigger                           TimeToTrigger
    },
    eventA3                                 SEQUENCE {
      a3-Offset                               MeasTriggerQuantityOffset,
      reportOnLeave                           BOOLEAN,
      hysteresis                              Hysteresis,
      timeToTrigger                           TimeToTrigger,
      useWhiteCellList                        BOOLEAN
    },
    eventA4                                 SEQUENCE f
      a4-Threshold                            MeasTriggerQuantity,
      reportOnLeave                           BOOLEAN,
      hysteresis                              Hysteresis,
      timeToTrigger                           TimeToTrigger,
      useWhiteCellList                        BOOLEAN
    },
    eventA5                                 SEQUENCE {
      a5-Threshold1                           MeasTriggerQuantity,
      a5-Threshold2                           MeasTriggerQuantity,
      reportOnLeave                           BOOLEAN,
      hysteresis                              Hysteresis,
      timeToTrigger                           TimeToTrigger,
      useWhiteCellList                        BOOLEAN
    },
    eventA6                                 SEQUENCE {
      a6-Offset                               MeasTriggerQuantityOffset,
      reportOnLeave                           BOOLEAN,
      hysteresis                              Hysteresis,
      timeToTrigger                           TimeToTrigger,
      useWhiteCellList                        BOOLEAN
    },
    ...
  },
  rsType                                  NR-RS-Type,
  reportInterval                          ReportInterval,
  reportAmount                            ENUMERATED {r1, r2, r4, r8, r16, r32, r64, infinity),
  reportQuantityCell                      MeasReportQuantity,
  maxReportCells                          INTEGER (1..maxCellReport),
  reportQuantityRsIndexes                 MeasReportQuantity           OPTIONAL,   -- Need R
  maxNrofRSIndexesToReport                INTEGER (1..maxNrofIndexesToReport)       OPTIONAL,   -- Need R
  includeBeamMeasurements                 BOOLEAN,
  reportAddNeighMeas                      ENUMERATED (setup)           OPTIONAL,   -- Need R
```

| ReportConfigNR information element |
|---|
| [[
    reportSizeReductionCondition        ENUMERATED   { RSRPthresholdBased, RSRQthresholdBased, SINRThresholdBased, TimerT310Based, AllofAbove} (Combination of these is not excluded and the procedural text above captures UE behavior for RSRPthresholdBased scheme)                           OPTIONAL,  -- Need R
    reportSizeReductionThreshold     ENUMERATED   { MeasTriggerQuantity, timerT310Status}                                                 OPTIONAL, -- Need R
    removedReportContents        ENUMERATED {beamMeasurements,servingCellMeaurements,bestNeighbourinServingFrequencies} (Combination of these is not excluded and the procedural text above captures UE behavior for beamMeasurements scheme)               OPTIONAL, -- Need R
    ]]
    ...
}
PeriodicalReportConfig ::=               SEQUENCE {
   rsType                                      NR-RS-Type,
   reportInterval                        ReportInterval,
   reportAmount                          ENUMERATED {r1, r2, r4, r8, r16, r32, r64, infinity},
   reportQuantityCell                  MeasReportQuantity,
   maxReportCells                        INTEGER (1..maxCellReport),
   reportQuantityRsIndexes            MeasReportQuantity   OPTIONAL,   -- Need R
   maxNrofRsIndexesToReport           INTEGER (1..maxNrofIndexesToReport)             OPTIONAL, -- Need R
   includeBeamMeasurements            BOOLEAN,
   useWhiteCellList                    BOOLEAN,
   ...
}
NR-RS-Type ::=                             ENUMERATED {ssb, csi-rs}
MeasTriggerQuantity ::=                 CHOICE {
   rsrp                                        RSRP-Range,
   rsrq                                        RSRQ-Range,
   sinr                                        SINR-Range
}
MeasTriggerQuantityOffset ::=        CHOICE {
   rsrp                                        INTEGER (−30..30),
   rsrq                                        INTEGER (−30..30),
   sinr                                        INTEGER (−30..30)
}
MeasReportQuantity ::=                  SEQUENCE {
   rsrp                                        BOOLEAN,
   rsrq                                        BOOLEAN,
   sinr                                        BOOLEAN
}
-- TAG-REPORT-CONFIG-START
-- ASN1STOP |

| EventTriggerConfig field descriptions |
|---|
| a3-Offset/a6-Offset
Offset value(s) to be used in NR measurement report triggering condition for event a3/a6. The actual value is field value * 0.5 dB.
aN-ThresholdM
Threshold value associated to the selected trigger quantity (e.g. RSRP, RSRQ, SINR) per RS Type (e.g. SS/PBCH block, CSI-RS) to be used in NR measurement report triggering condition for event number aN. If multiple thresholds are defined for event number aN, the thresholds are differentiated by M. The network configures aN-Threshold1 only for events A1, A2, A4, A5 and a5-Threshold2 only for event A5.
eventId
Choice of NR event triggered reporting criteria.
maxNrofRsIndexesToReport
Max number of measurement information per RS index to include in the measurement report for A1-A6 events.
maxReportCells
Max number of non-serving cells to include in the measurement report.
reportAddNeighMeas
Indicates that the UE shall include the best neighbour cells per serving frequency.
reportAmount
Number of measurement reports applicable for eventTriggered as well as for periodical report types
reportOnLeave
Indicates whether or not the UE shall initiate the measurement reporting procedure when the leaving condition is met for a cell in cellsTriggeredList, as specified in 5.5.4.1.
report QuantityCell
The cell measurement quantities to be included in the measurement report.
reportQuantityRsIndexes
Indicates which measurement information per RS index the UE shall include in the measurement report.
timeToTrigger
Time during which specific criteria for the event needs to be met in order to trigger a measurement report.
useWhiteCellList
Indicates whether only the cells included in the white-list of the associated measObject are applicable as specified in 5.5.4.1. |

| PeriodicalReportConfig field descriptions |
|---|
| maxNrofRsIndexesToReport
Max number of measurement information per RS index to include in the measurement report for A1-A6 events.
maxReportCells |

-continued

Max number of non-serving cells to include in the measurement report.
reportAmount
Number of measurement reports applicable for event Triggered as well as for periodical report types
reportQuantityCell
The cell measurement quantities to be included in the measurement report.
reportQuantityRsIndexes
Indicates which measurement information per RS index the UE shall include in the measurement report.
useWhiteCellList
Indicates whether only the cells included in the white-list of the associated measObject are applicable as specified in 5.5.4.1.

End of Third Changes

Figure 4:
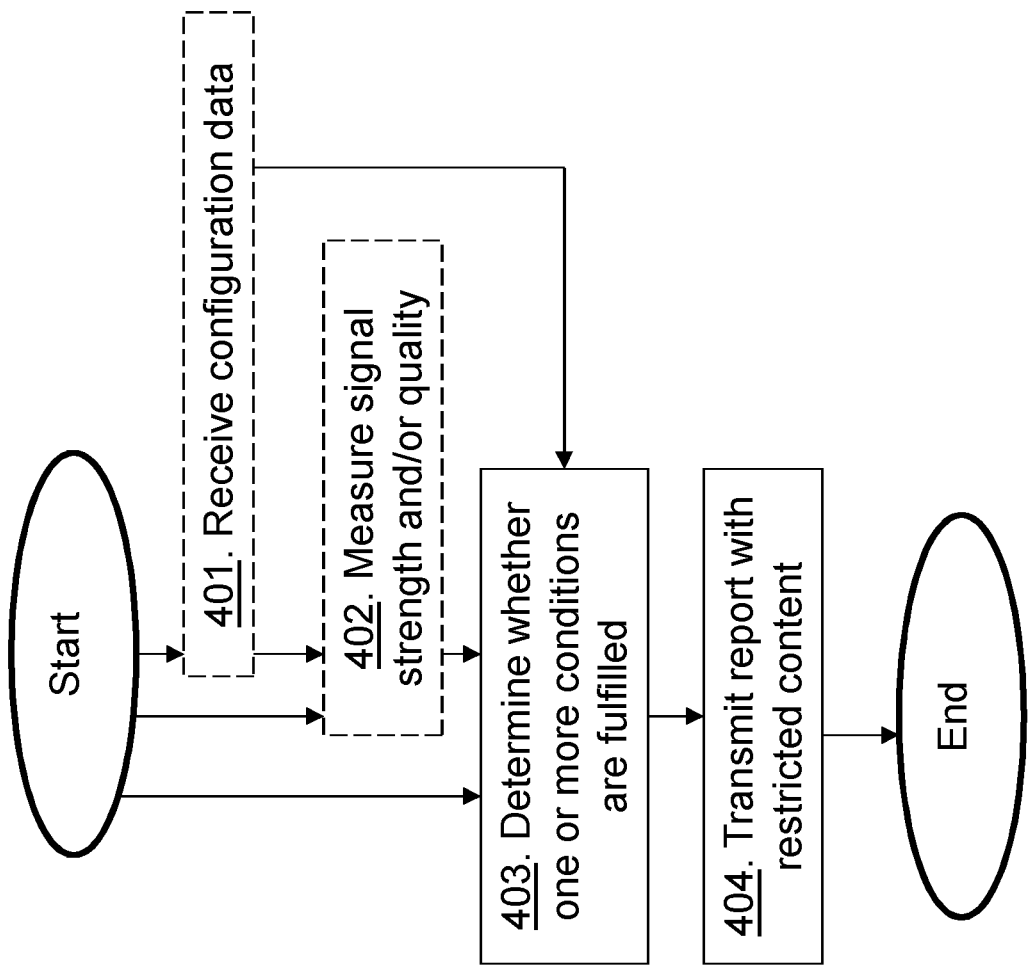
FIG. 4 is a flowchart depicting a method performed by a UE according to embodiments herein.

The method actions performed by the UE 10 for handling signal measurements, such as measurement reporting in the communication network 1 according to embodiments will now be described with reference to a flowchart depicted in FIG. 4. The actions do not have to be taken in the order stated below, but may be taken in any suitable order. Actions performed in some embodiments are marked with dashed boxes.

Action 401. The UE 10 may receive configuration data from a network node such as the radio network node 12 or being preconfigured with the configuration data. The configuration data may comprise the one or more conditions defining when to transmit a report indicating a radio condition being below a threshold, wherein the report is with restricted content such as reduced size.

Action 402. The UE 10 may measure signal strength or signal quality of a signal from the radio network node 12.

Action 403. The UE 10 determines whether the one or more conditions are fulfilled for indicating that the radio condition is below the certain level. The UE may determine whether the one or more conditions are fulfilled for indicating that the radio condition is below the certain level (set level), based on the measured signal strength or signal quality.

Action 404. According to embodiments herein, in response to that the one or more conditions are fulfilled and thereby indicating the radio condition being below a threshold, the UE 10 transmits the report with restricted content. E.g. in case one or more conditions are fulfilled and thereby indicating the radio condition of a low level the UE 10 transmits a report of reduced size. The report with restricted content may comprise a report of reduced size by excluding some information in the report.

Figure 5:
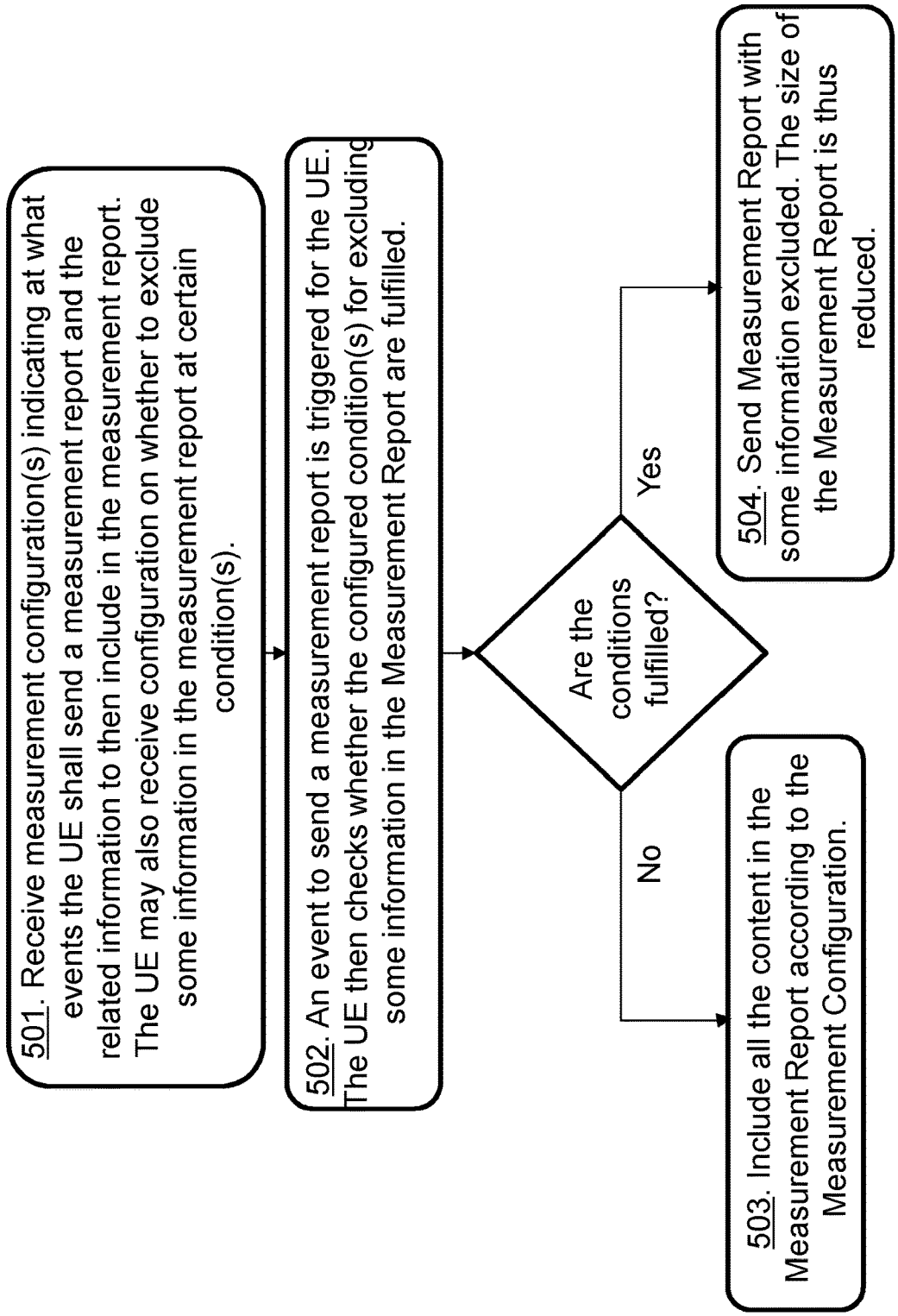
FIG. 5 is a flowchart depicting a method performed by a UE according to some embodiments herein.

The method actions performed by the UE 10 for performing measurement reporting according to some embodiments will now be described with reference to a flowchart depicted in FIG. 5. The actions do not have to be taken in the order stated below, but may be taken in any suitable order.

Action 501. The UE 10 may receive e.g. a measurement configuration indicating at what events the UE 10 shall send a measurement report and the related information to then include in the measurement report. The UE 10 may also receive configuration data on whether to exclude some information in the measurement report at certain conditions. This is an example of action 401 above.

Action 502. The UE 10 initiates a measurement report process. E.g. an event to send a measurement report is triggered for the UE 10. The UE 10 may then check whether the configured condition(s) for excluding some information in the measurement report are fulfilled. I.e. the UE 10 may check whether the radio condition is below a set level.

Action 503. In case the one or more conditions are not fulfilled, i.e. the radio condition is above or equal a certain level, the UE 10 may then include all the content in the measurement report according to the measurement configuration.

Action 504. In case the one or more conditions are fulfilled, i.e. the radio condition is below the certain level, the UE 10 sends measurement report with some information excluded. The size of the measurement report is thus reduced. This is an example of action 404 above.

Figure 6:
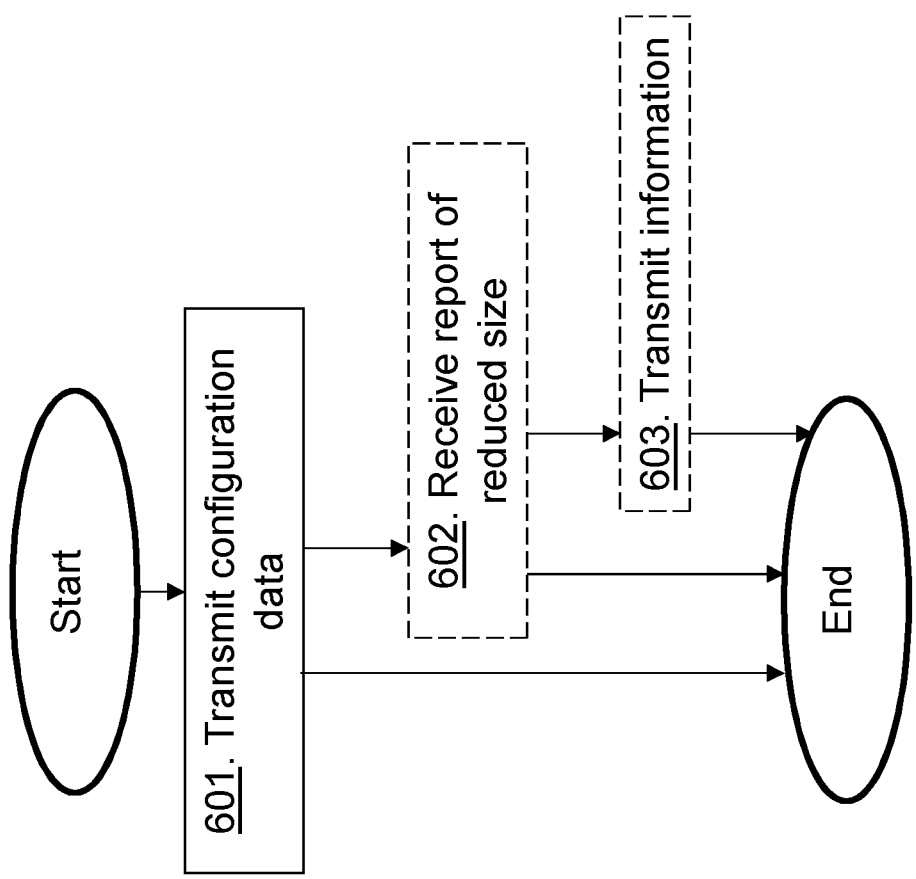
FIG. 6 is a flowchart depicting a method performed by a radio network node according to embodiments herein.

The method actions performed by the radio network node 12 for configuring the UE 10 in the wireless communication network such as for configuring the UE in the wireless communication network for measurement reporting according to some embodiments will now be described with reference to a flowchart depicted in FIG. 6. The actions do not have to be taken in the order stated below, but may be taken in any suitable order. Actions performed in some embodiments are marked with dashed boxes.

Action 601. The radio network node 10 transmits configuration data to the UE 10, wherein the configuration data comprises the one or more conditions defining when to transmit the (measurement) report indicating the radio condition being below a threshold, wherein the report is with restricted content i.e. of reduced size. The configuration data may be transmitted as dedicated signalling or as broadcast information in e.g. MIB or SIB. The report with restricted content may comprise a report of reduced size by excluding some information in the report.

Action 602. The radio network node 10 may then receive the report with restricted content. I.e. in case one or more conditions are fulfilled at the wireless device thereby indicating a radio condition of a low level at the UE 10, the radio network node 12 may receive a report of reduced size.

Action 603. The radio network node 10 may then transmit to another radio network node or another cell, information indicating that the UE 10 reports with restricted content.

FIG. 7 is a block diagram depicting the UE 10 for handling signal measurements such as reporting signal measurements, or handling measurements, in the wireless communication network 1 according to embodiments herein.

The UE 10 may comprise processing circuitry 801, e.g. one or more processors, configured to perform the methods herein.

The UE 10 may comprise a receiving unit 802, e.g. a receiver or a transceiver. The UE 10, the processing circuitry 801, and/or the receiving unit 802 may be configured to receive the configuration data from a network node such as the radio network node 12, wherein the configuration data comprises the one or more conditions defining when to transmit a measurement report of reduced size.

The UE 10 may comprise a measuring unit 803. The radio network node 12, the processing circuitry 801, and/or the measuring unit 803 may be configured to measure the signal strength or signal quality of the signal from the radio network node, e.g. one or more signals from one or more radio network nodes.

The UE 10 may comprise a determining unit 804. The UE 10, the processing circuitry 801, and/or the determining unit 804 is configured to determine whether the one or more conditions are fulfilled for indicating that the radio condition is below the certain level e.g. based on the measured signal strength or signal quality.

The UE 10 may comprise a reporting unit 805 e.g. a transmitter or a transceiver. The UE 10, the processing circuitry 801, and/or the reporting unit 805 is configured to, in response to that the one or more conditions are fulfilled and thereby indicating the radio condition is below the threshold, transmit the report with restricted content. E.g. the UE 10, the processing circuitry 801, and/or the reporting unit 805 may be configured to Send Measurement Report with some information excluded. The size of the Measurement Report is thus reduced. The report with restricted content may comprise a report of reduced size by excluding some information in the report.

The UE 10 further comprises a memory 807. The memory comprises one or more units to be used to store data on, such as RSs, strengths or qualities, configuration data, measurement reports, applications to perform the methods disclosed herein when being executed, and similar. The UE 10 comprises a communication interface comprising one or more antennas.

The methods according to the embodiments described herein for the UE 10 are respectively implemented by means of e.g. a computer program product 808 or a computer program, comprising instructions, i.e., software code portions, which, when executed on at least one processor, cause the at least one processor to carry out the actions described herein, as performed by the UE 10. The computer program product 808 may be stored on a computer-readable storage medium 809, e.g. a universal serial bus (USB) stick, a disc or similar. The computer-readable storage medium 809, having stored thereon the computer program product, may comprise the instructions which, when executed on at least one processor, cause the at least one processor to carry out the actions described herein, as performed by the UE 10. In some embodiments, the computer-readable storage medium may be a non-transitory or a transitory computer-readable storage medium.

Figure 8:
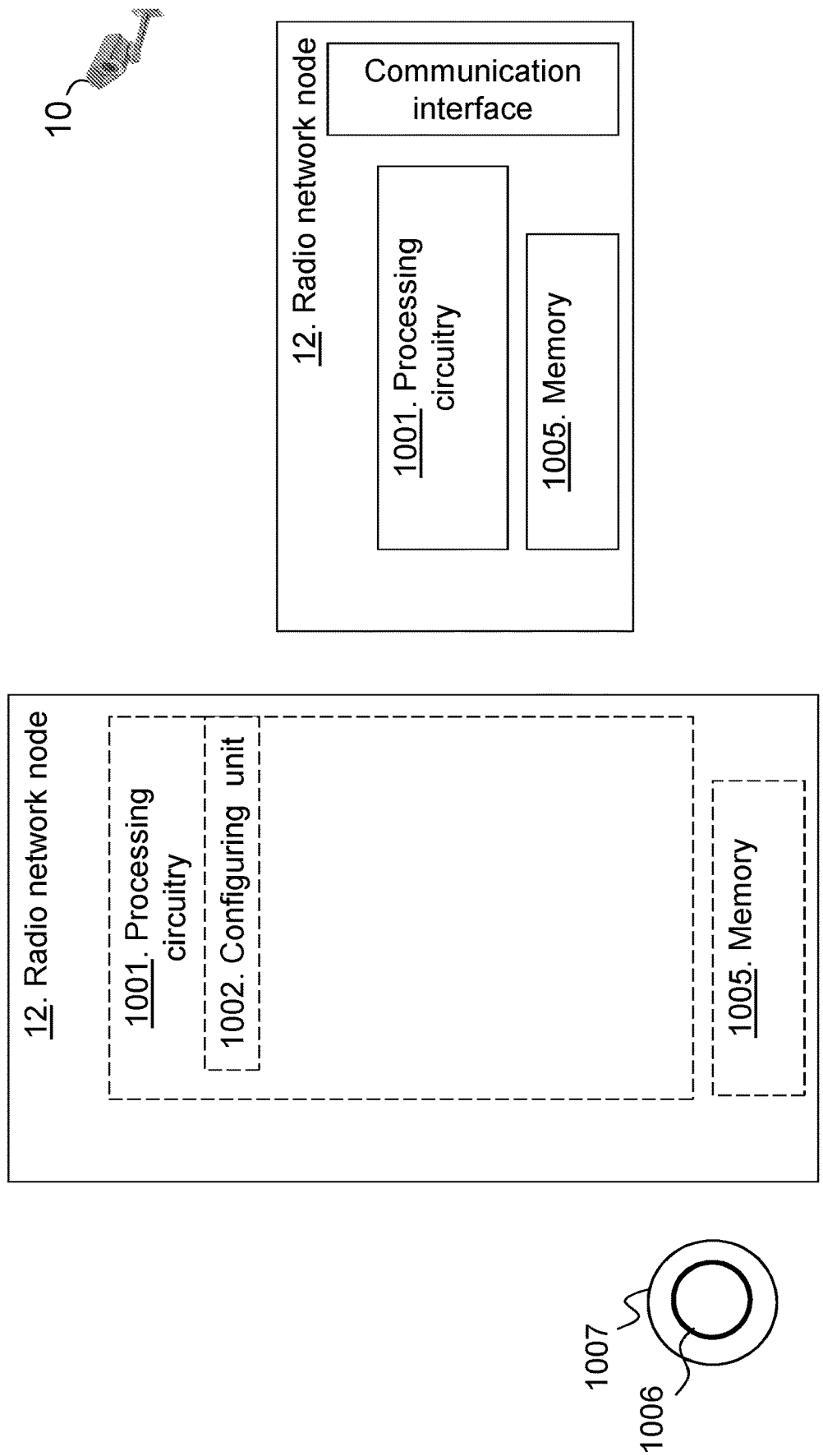
FIG. 8 is a block diagram depicting a radio network node according to embodiments herein.

FIG. 8 is a block diagram depicting the radio network node 12 for configuring UEs such as the UE 10 in the wireless communication network 1 according to embodiments herein.

The radio network node 12 may comprise processing circuitry 1001, e.g. one or more processors, configured to perform the methods herein.

The radio network node 12 may comprise a configuring unit 1002. The radio network node 12, the processing circuitry 1001 and/or the configuring unit 1002 may be configured to transmit configuration data to the UE 10, wherein the configuration data comprises one or more conditions defining when to transmit a report indicating radio condition, wherein the report is with restricted content. . The radio network node 12, the processing circuitry 1001 and/or the configuring unit 1002 may be configured to configure the UE 10 with the configuration data. The configuration data may comprise one or more conditions defining when to transmit a measurement report of reduced size. Thus, the report with restricted content may comprise a report of reduced size by excluding some information in the report. The radio network node 12 may be configured to receive the report with restricted content. transmit to another radio network node or another cell, information indicating that the UE reports with restricted content.

The radio network node 12 further comprises a memory 1005. The memory comprises one or more units to be used to store data on, such as strengths or qualities, one or more conditions, configuration data, measurement reports, applications to perform the methods disclosed herein when being executed, and similar. The radio network node 12 comprises a communication interface comprising transmitter, receiver, transceiver and/or one or more antennas.

The methods according to the embodiments described herein for radio network node 12 are respectively implemented by means of e.g. a computer program product 1006 or a computer program product, comprising instructions, i.e., software code portions, which, when executed on at least one processor, cause the at least one processor to carry out the actions described herein, as performed by the radio network node 12. The computer program product 1006 may be stored on a computer-readable storage medium 1007, e.g. a universal serial bus (USB) stick, a disc or similar. The computer-readable storage medium 1007, having stored thereon the computer program product, may comprise the instructions which, when executed on at least one processor, cause the at least one processor to carry out the actions described herein, as performed by the radio network node 12. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) node etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for Narrowband IoT and/or MTC. However the embodiments are applicable to any RAT or multi-RAT systems, where the UE receives and/or transmit signals (e.g. data) e.g. New Radio (NR), LTE, LTE FDD/TDD, WCDMA/HSPA, GSM/GERAN, Wi Fi, WLAN, CDMA2000 etc.

Measurement Reference Signal (MRS): As used herein, a "MRS" is any signal used for mobility measurements in Mobility measurement beams. Thus, while the term "MRS" is used herein to refer a signal used herein, the term "MRS" is to be construed broadly to mean any signal, regardless of what the signal is named, e.g., in any particular standard, used for mobility measurements and, in particular, used according to the embodiments described herein. In some embodiments, a MRS is a mobility specific signal that is used for handover/beam switching purposes. This reference signal can be periodic or aperiodic. It can be configured to be wireless device specific or could be used common for more than one wireless device.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 9:
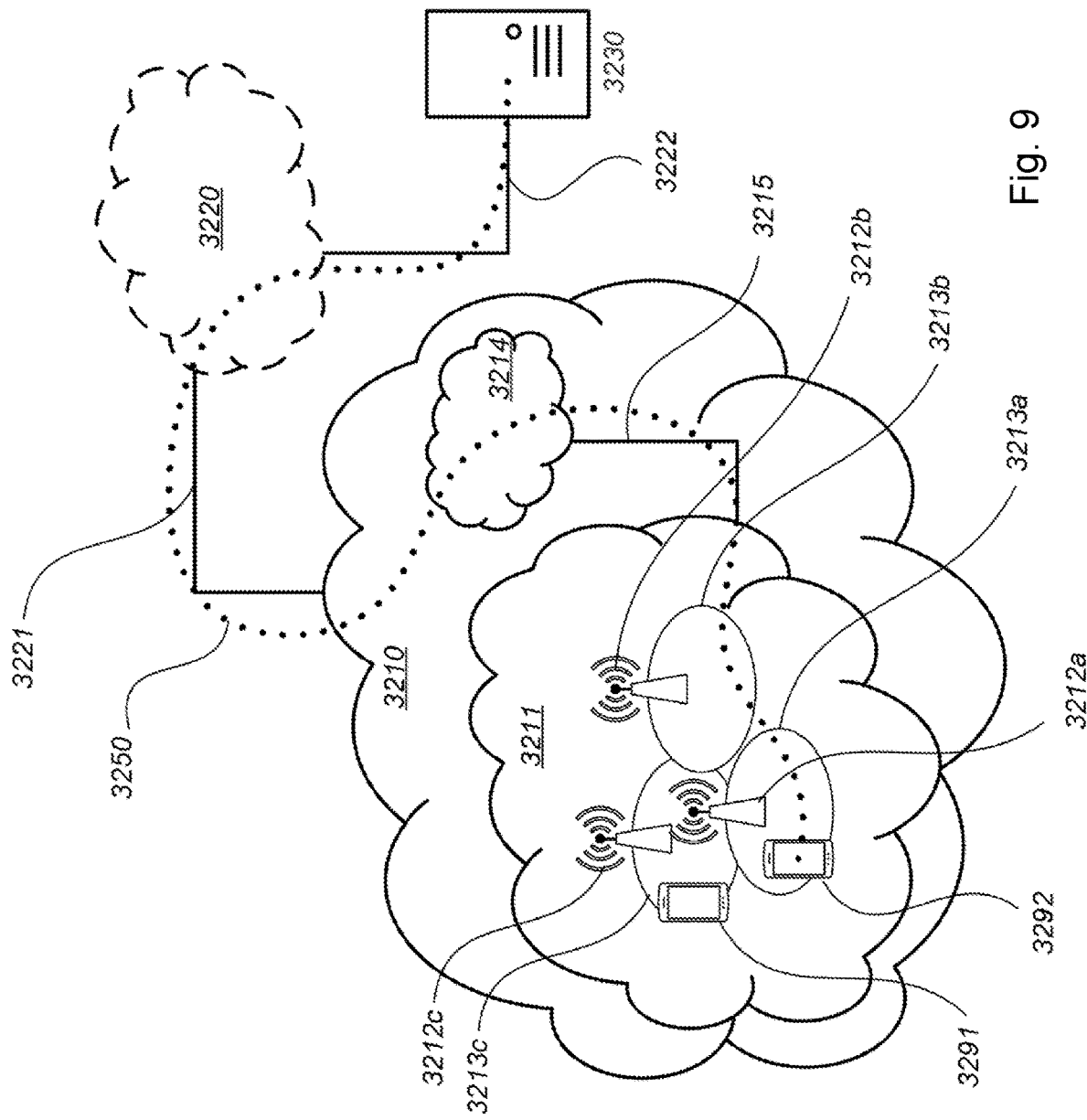
FIG. 9 schematically illustrates a telecommunication network connected via an intermediate network to a host computer.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
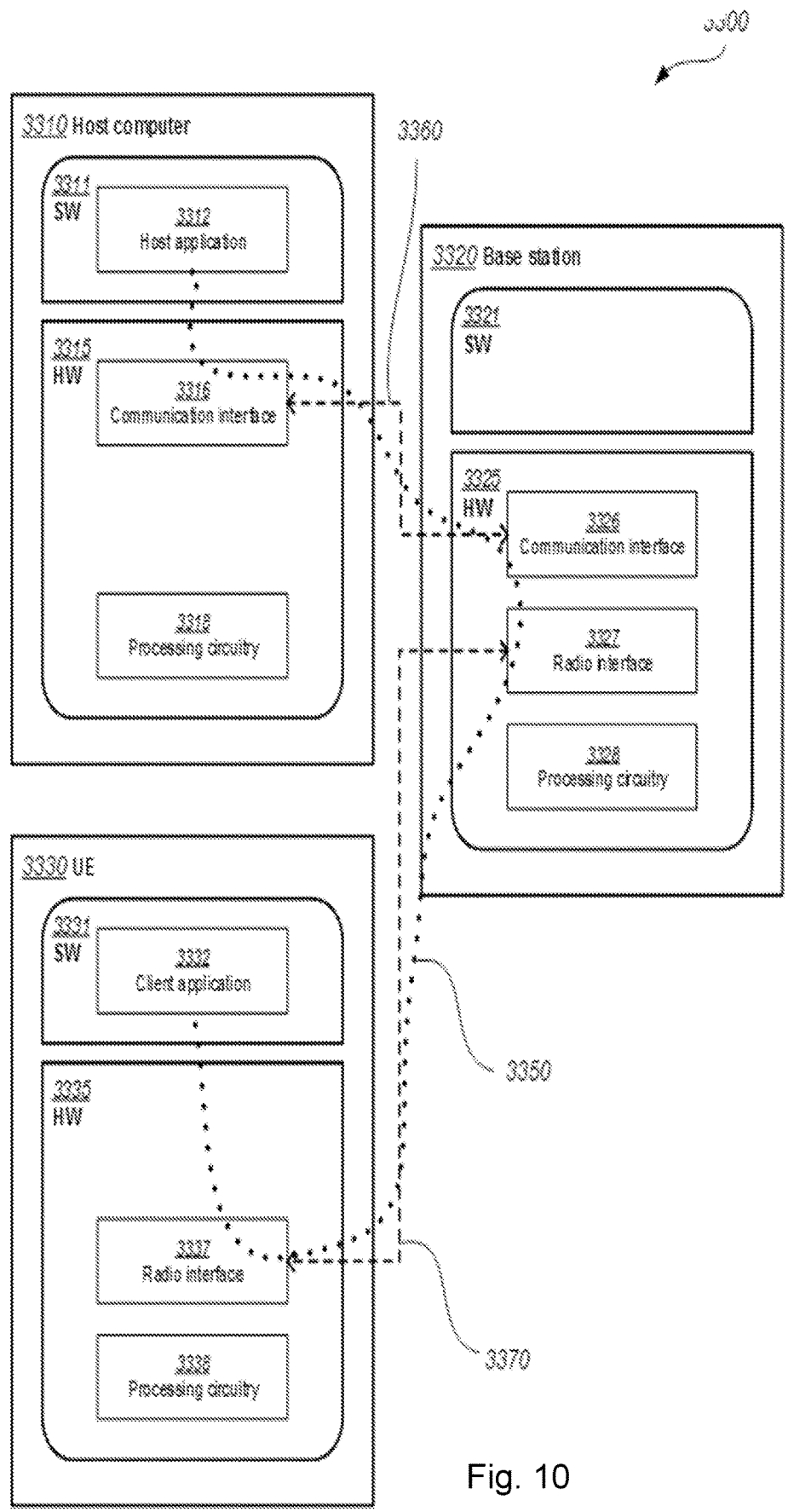
FIG. 10 is a generalized block diagram of a host computer communicating via a base station with a user equipment over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve transmission rate since measurement may be successfully transmitted in poor radio conditions and thereby provide benefits such as improved performance of the UEs, and e.g. better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 20. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

ACK Acknowledged
ADC Analog-to-digital conversion
AGC Automatic gain control
ANR Automatic neighbour relations
AP Access point
BCH Broadcast channel
BLER Block error rate
BRS Beam Reference Signal
BS Base station
BSC Base station controller
BTS Base transceiver station
CA Carrier aggregation
CC Component carrier
CG Cell group
CGI Cell global identity
CP Cyclic prefix
CPICH Common pilot channel
CQI Channel Quality Indicator
CSG Closed subscriber group
CSI-RS Channel State Information Reference Signal
DAS Distributed antenna system
DC Dual connectivity
DFT Discrete Fourier Transform
DL Downlink
DL-SCH Downlink shared channel
DRX Discontinuous reception
EARFCN Evolved absolute radio frequency channel number
ECGI Evolved CGI
eNB eNodeB
FDD Frequency division duplex
FFT Fast Fourier transform
HD-FDD Half duplex FDD
HO Handover
ID Identity
M2M machine to machine
MAC Media access control
MCG Master cell group
MDT Minimization of drive tests
MeNB Master eNode B
MIB Master information block
MME Mobility management entity
MRS Mobility Reference Signal
MRTD Maximum receive timing difference
MSR Multi-standard radio
NACK Not acknowledged
OFDM Orthogonal frequency-division multiplexing
RI Rank Indicator
SI System Information
PCC Primary component carrier
PCI Physical cell identity
PCell Primary Cell
PCG Primary Cell Group
PCH Paging channel
PDU Protocol data unit
PGW Packet gateway
PHICH Physical HARQ indication channel
PLMN Public land mobile network
PMI Precoding Matrix Indicator
PSCell Primary SCell
PSC Primary serving cell
PSS Primary synchronization signal
RAT Radio access Technology
RF Radio frequency
RLM Radio link monitoring
RNC Radio network Controller
RRC Radio resource control
RRH Remote radio head
RRU Remote radio unit
RSCP Received signal code power
RSRP Reference Signal Received Power
RSRQ Reference Signal Received Quality
RSSI Received signal strength indication
RSTD Reference signal time difference
RV Redundancy version
Rx Receiver
SCC Secondary component carrier
SCell Secondary Cell
SCG Secondary Cell Group
SeNB Secondary eNode B
SFN System frame number
SGW Signalling gateway
SI System information
SIB System information block
SIB1 System information block type 1
SINR Signal to interference and noise ratio
SON Self-organizing networks
SSC Secondary serving cell
SSS Secondary synchronization signal
TA Timing advance
TAG Timing advance group
TDD Time division duplex
Tx Transmitter
UARFCN UMTS Absolute Radio Frequency Channel Number
UE User equipment
UL Uplink

The invention claimed is:
1. A method performed by radio network node for configuring a user equipment, UE, in a wireless communication network, the method comprising:

transmitting configuration data to the UE, the configuration data comprising one or more conditions defining when to transmit a report indicating a radio condition being below a threshold, the report being with restricted content;

receiving the report with restricted content; and transmitting to one of another radio network node and another cell, information indicating that the UE reports with restricted content.

2. The method according to claim 1, wherein the report with restricted content comprises a report of reduced size by excluding some information in the report.

3. A radio network node for configuring a user equipment, UE, in a wireless communication network, the radio network node being configured to:

transmit configuration data to the UE, the configuration data comprising one or more conditions defining when to transmit a report indicating radio condition being below a threshold, the report being with restricted content;

receive a report with restricted content; and transmit to one of another radio network node and another cell, information indicating that the UE reports with restricted content.

4. The radio network node according to claim 3, wherein the report with restricted content comprises a report of reduced size by excluding some information in the report.

* * * * *